Sept. 14, 1965  E. L. ZIBBELL ETAL  3,205,994
MECHANICAL CAN VENDING SYSTEM
Filed April 1, 1963  12 Sheets-Sheet 1
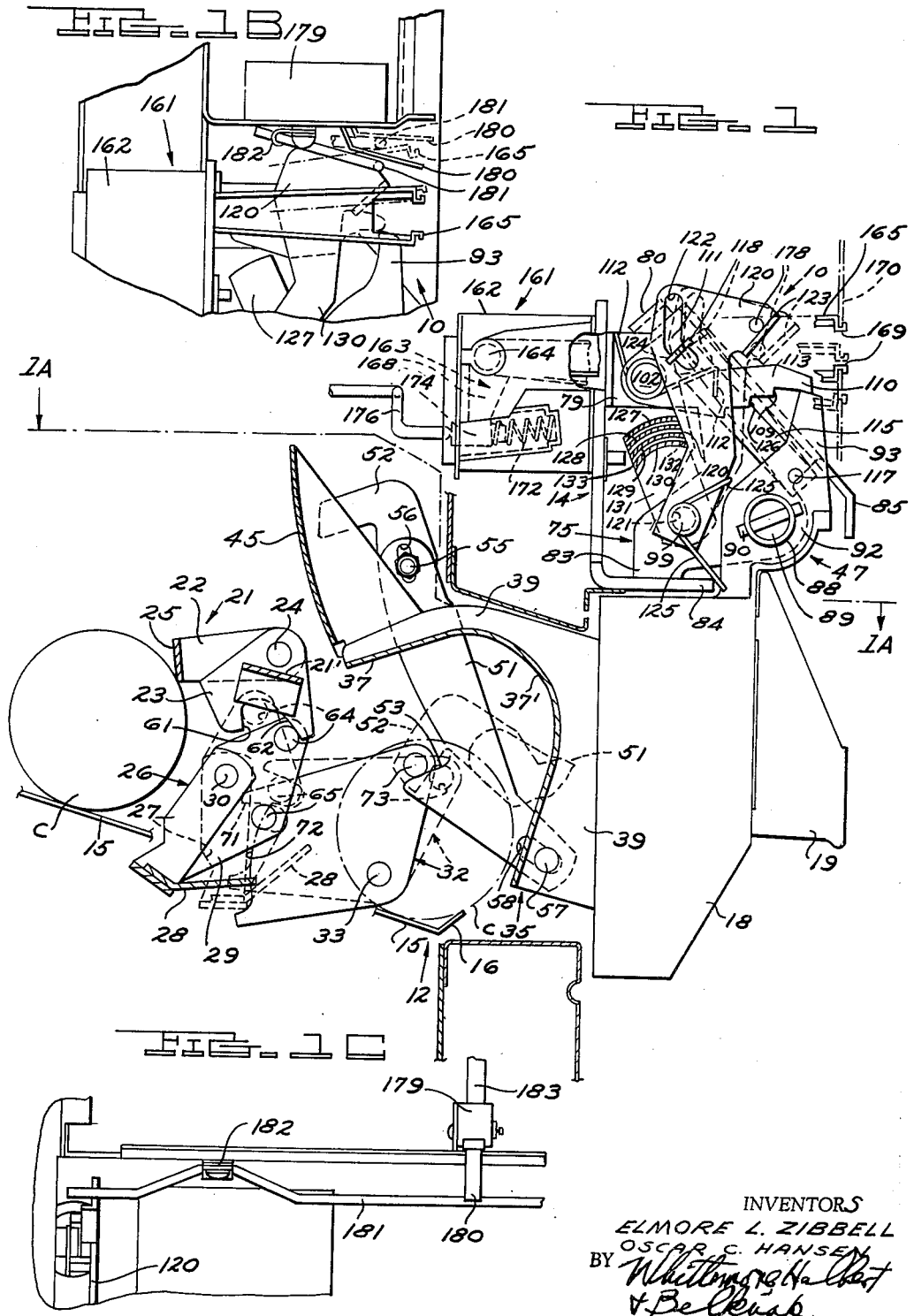
INVENTORS
ELMORE L. ZIBBELL
OSCAR C. HANSEN
BY Whittemore Hulbert
 & Belknap
ATTORNEYS Sept. 14, 1965  E. L. ZIBBELL ETAL  3,205,994
MECHANICAL CAN VENDING SYSTEM
Filed April 1, 1963  12 Sheets-Sheet 2
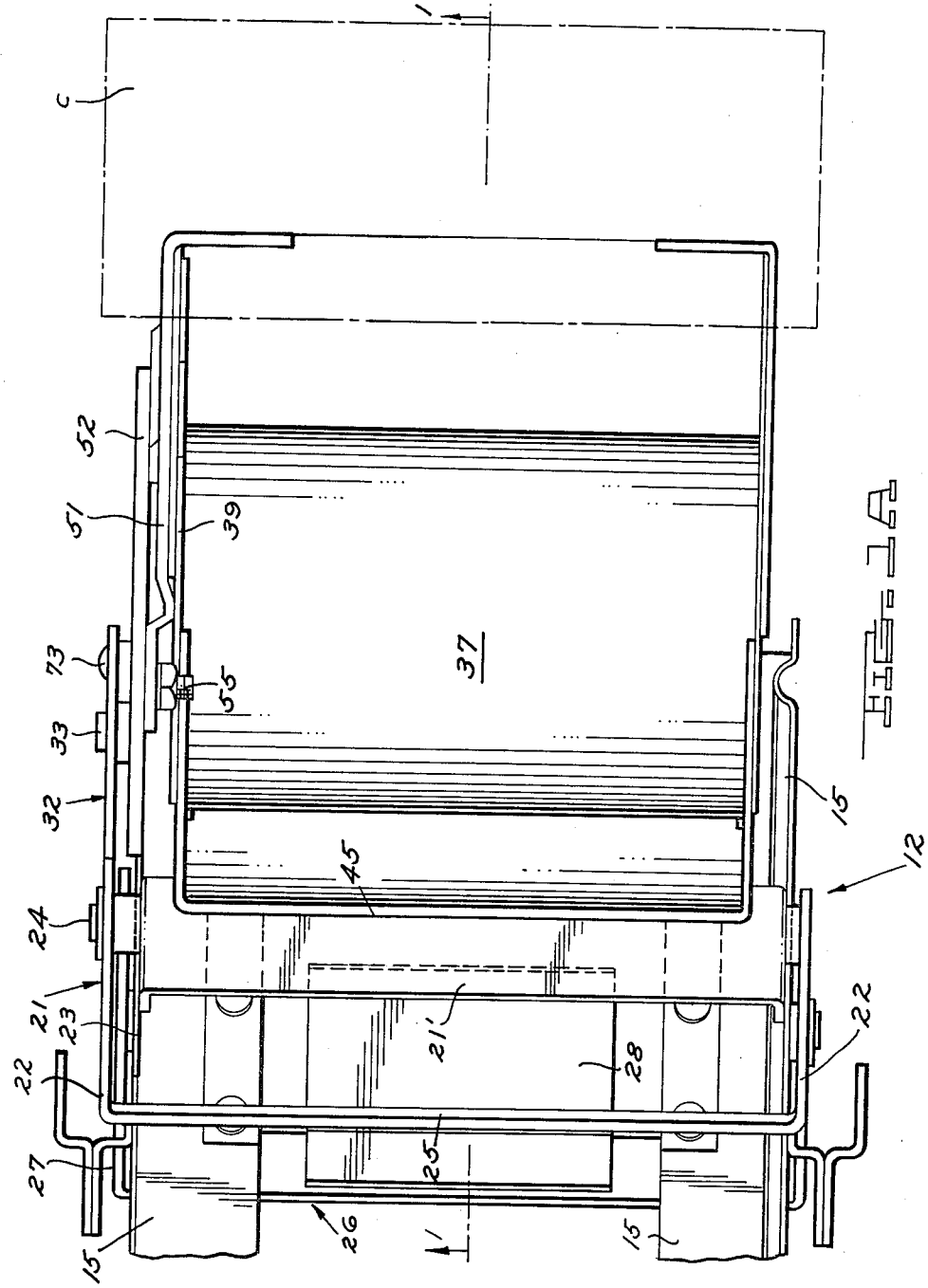
INVENTORS
ELMORE L. ZIBBELL
OSCAR C. HANSEN
BY
ATTORNEYS Sept. 14, 1965     E. L. ZIBBELL ETAL     3,205,994
MECHANICAL CAN VENDING SYSTEM
Filed April 1, 1963     12 Sheets-Sheet 3
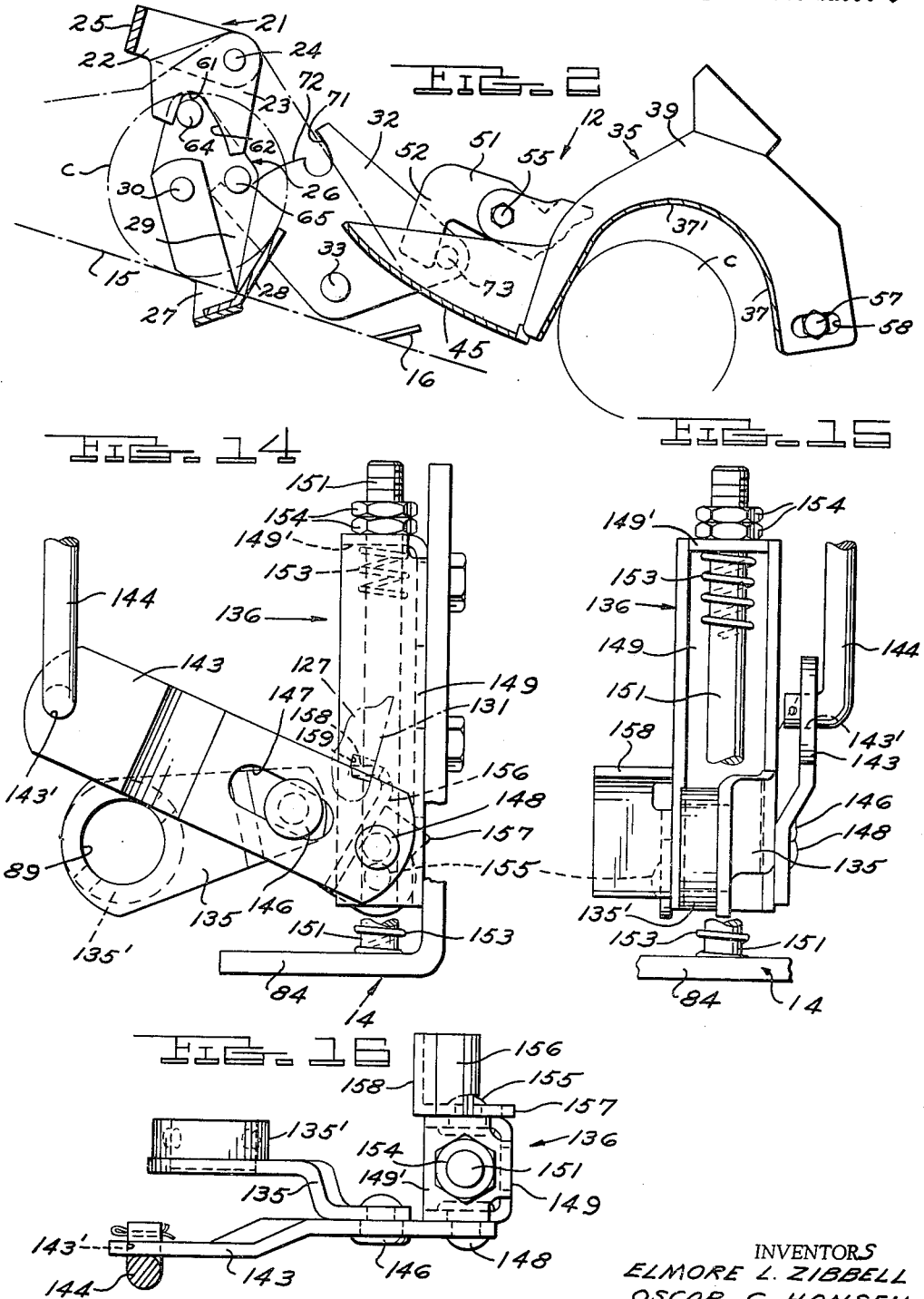
INVENTORS
ELMORE L. ZIBBELL
OSCAR C. HANSEN
BY
ATTORNEYS Sept. 14, 1965 E. L. ZIBBELL ETAL 3,205,994
MECHANICAL CAN VENDING SYSTEM
Filed April 1, 1963 12 Sheets-Sheet 4
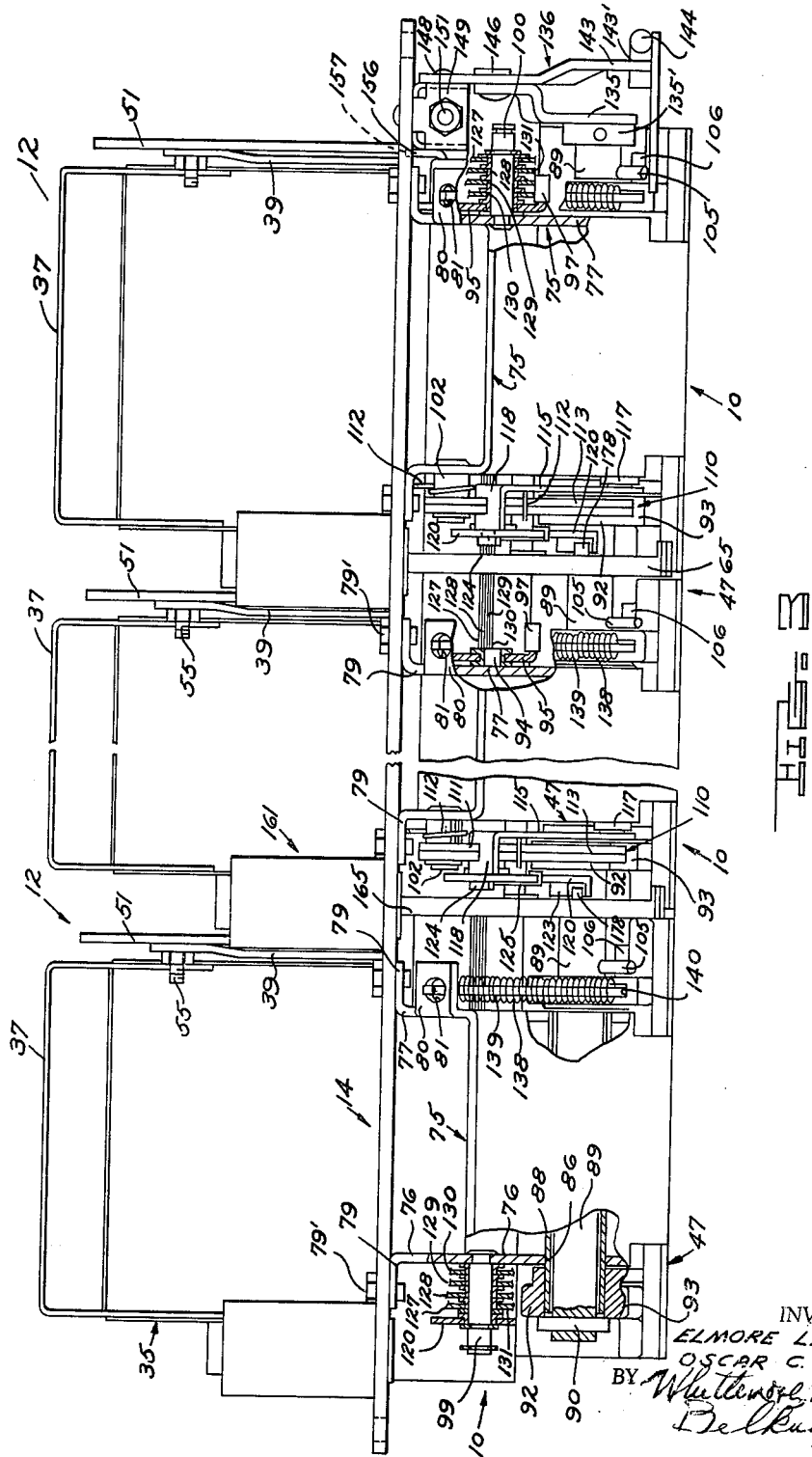
INVENTORS
ELMORE L. ZIBBELL
OSCAR C. HANSEN
BY
ATTORNEYS

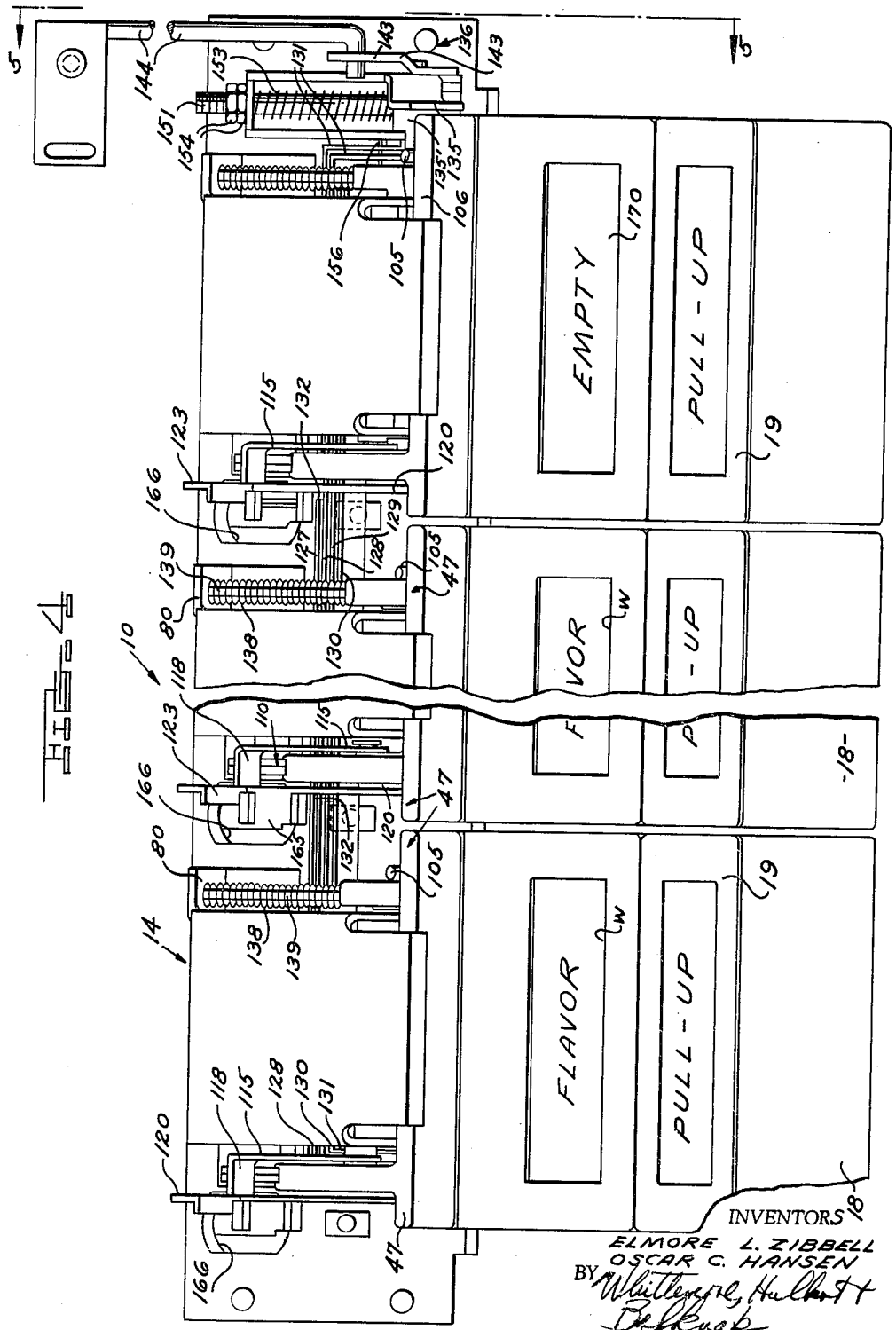

Sept. 14, 1965  E. L. ZIBBELL ETAL  3,205,994
MECHANICAL CAN VENDING SYSTEM
Filed April 1, 1963  12 Sheets-Sheet 6

INVENTORS
ELMORE L. ZIBBELL
OSCAR C. HANSEN
BY Whittemore, Hulbert
Belknap
ATTORNEYS

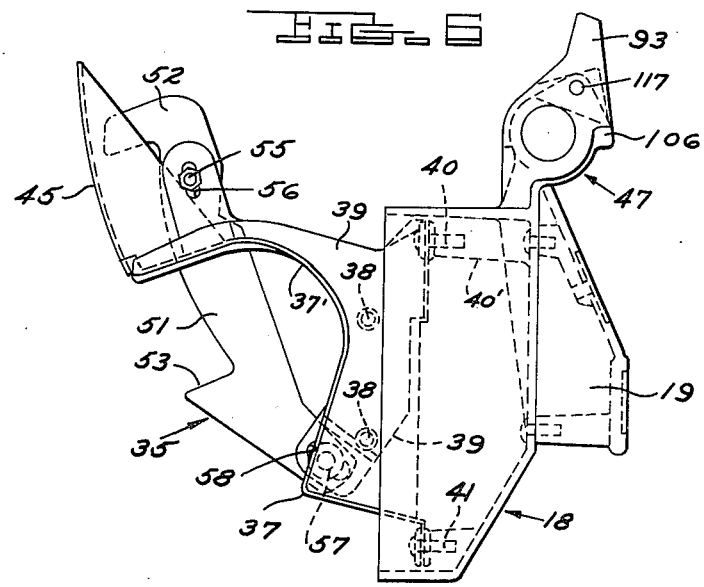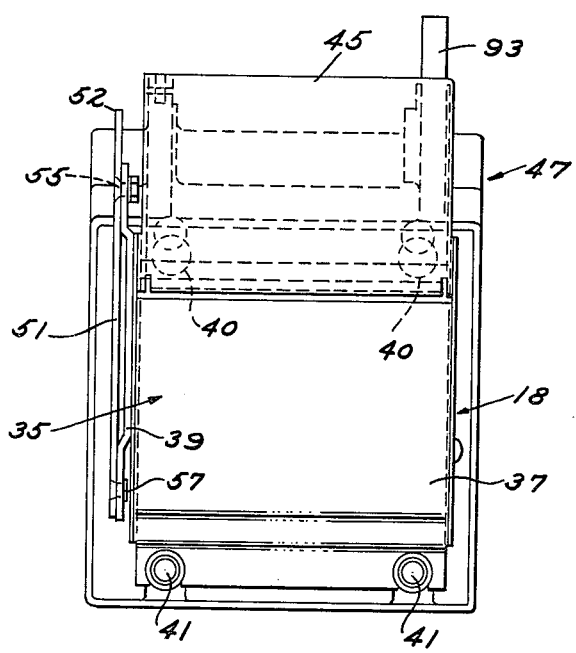

Sept. 14, 1965 E. L. ZIBBELL ETAL 3,205,994
MECHANICAL CAN VENDING SYSTEM
Filed April 1, 1963 12 Sheets-Sheet 8

INVENTORS
ELMORE L. ZIBBELL
OSCAR C. HANSEN
BY
ATTORNEYS

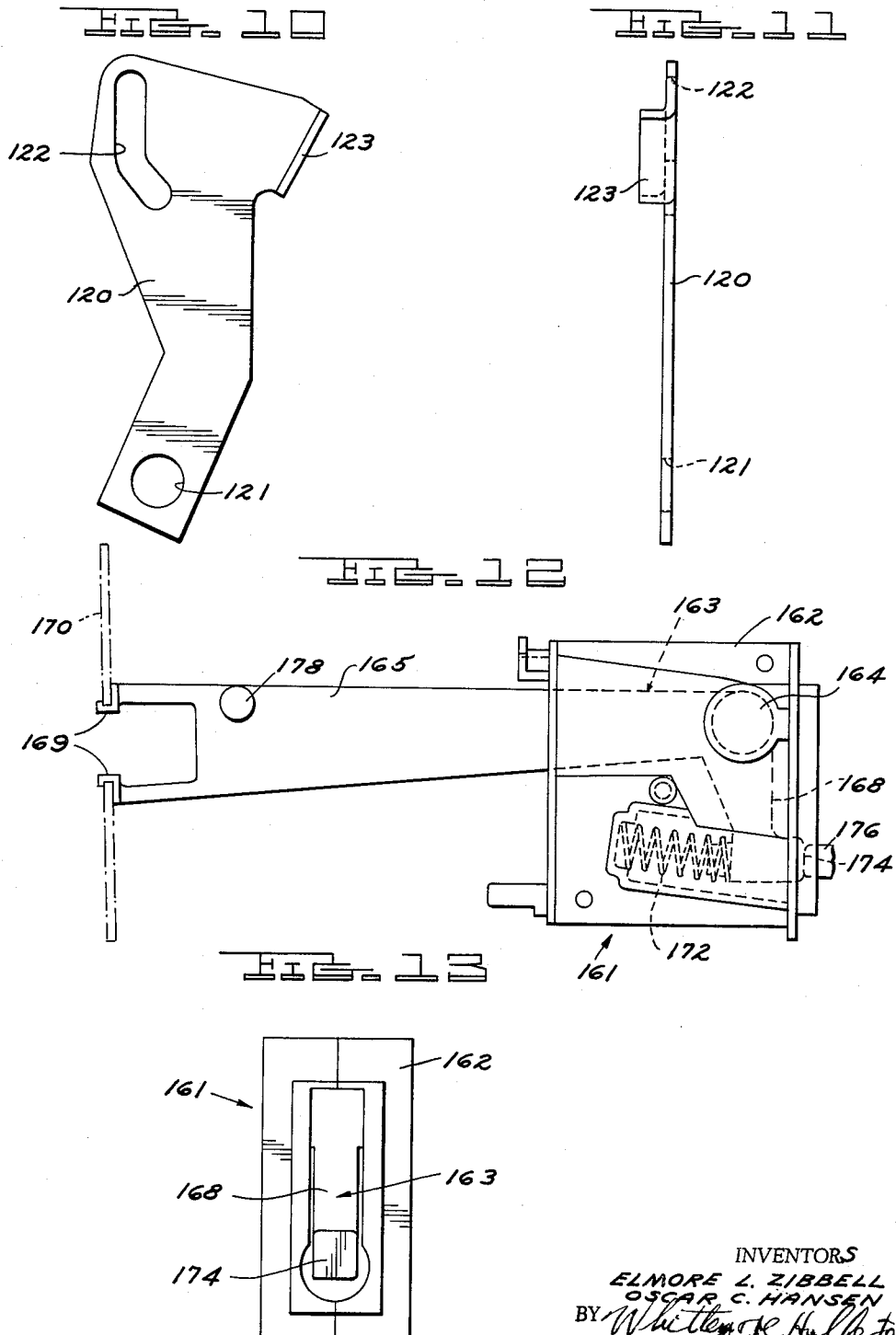

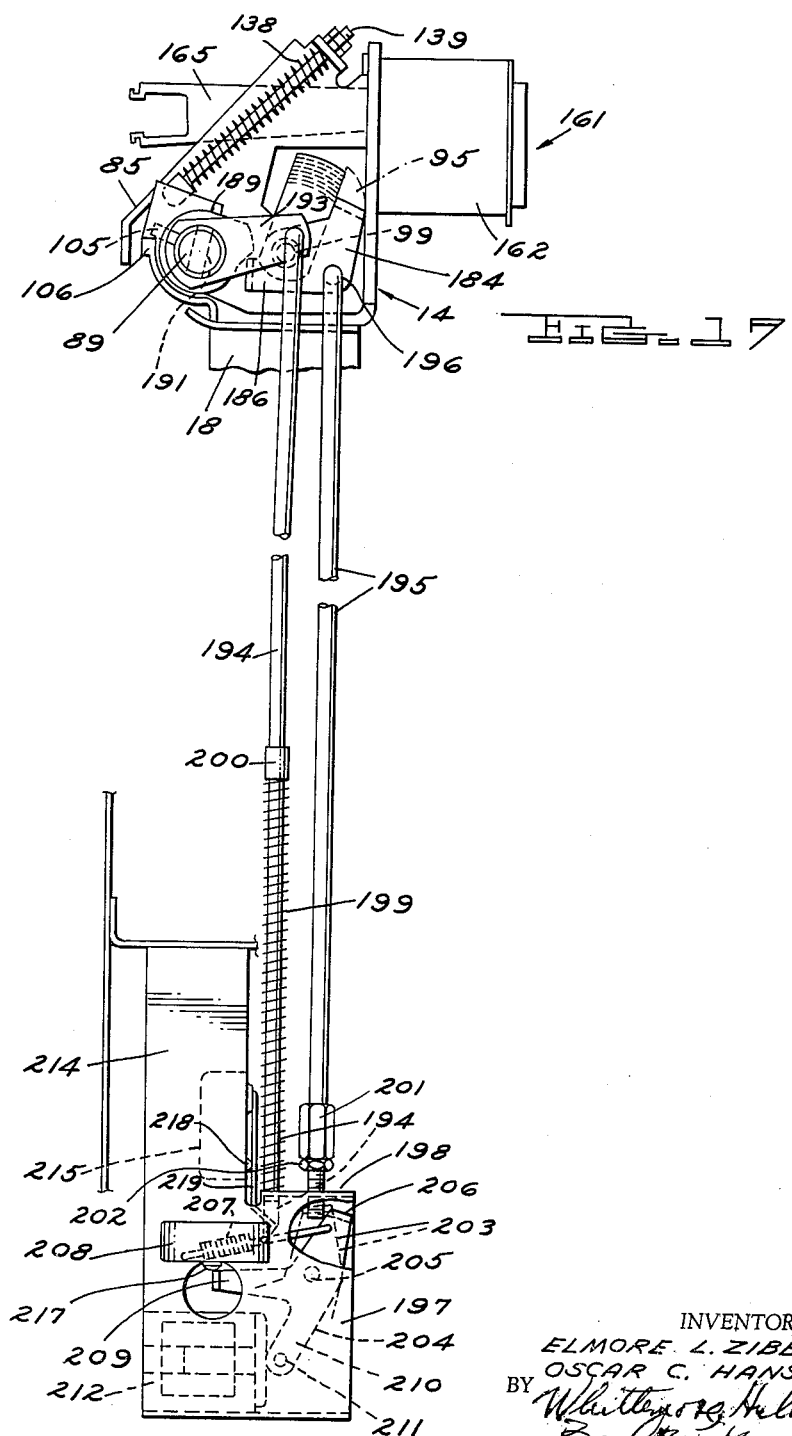

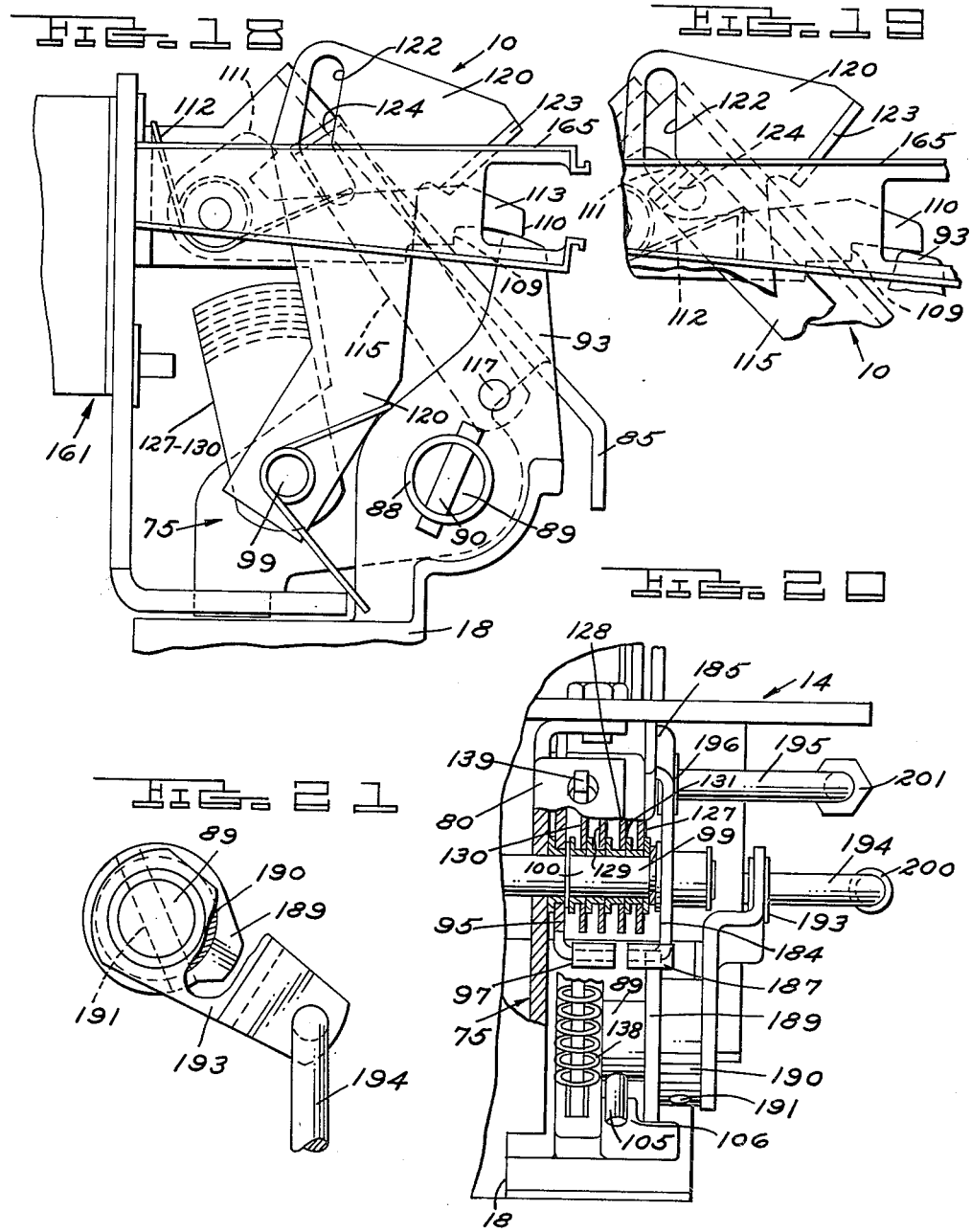

Sept. 14, 1965     E. L. ZIBBELL ETAL     3,205,994
MECHANICAL CAN VENDING SYSTEM
Filed April 1, 1963     12 Sheets-Sheet 12
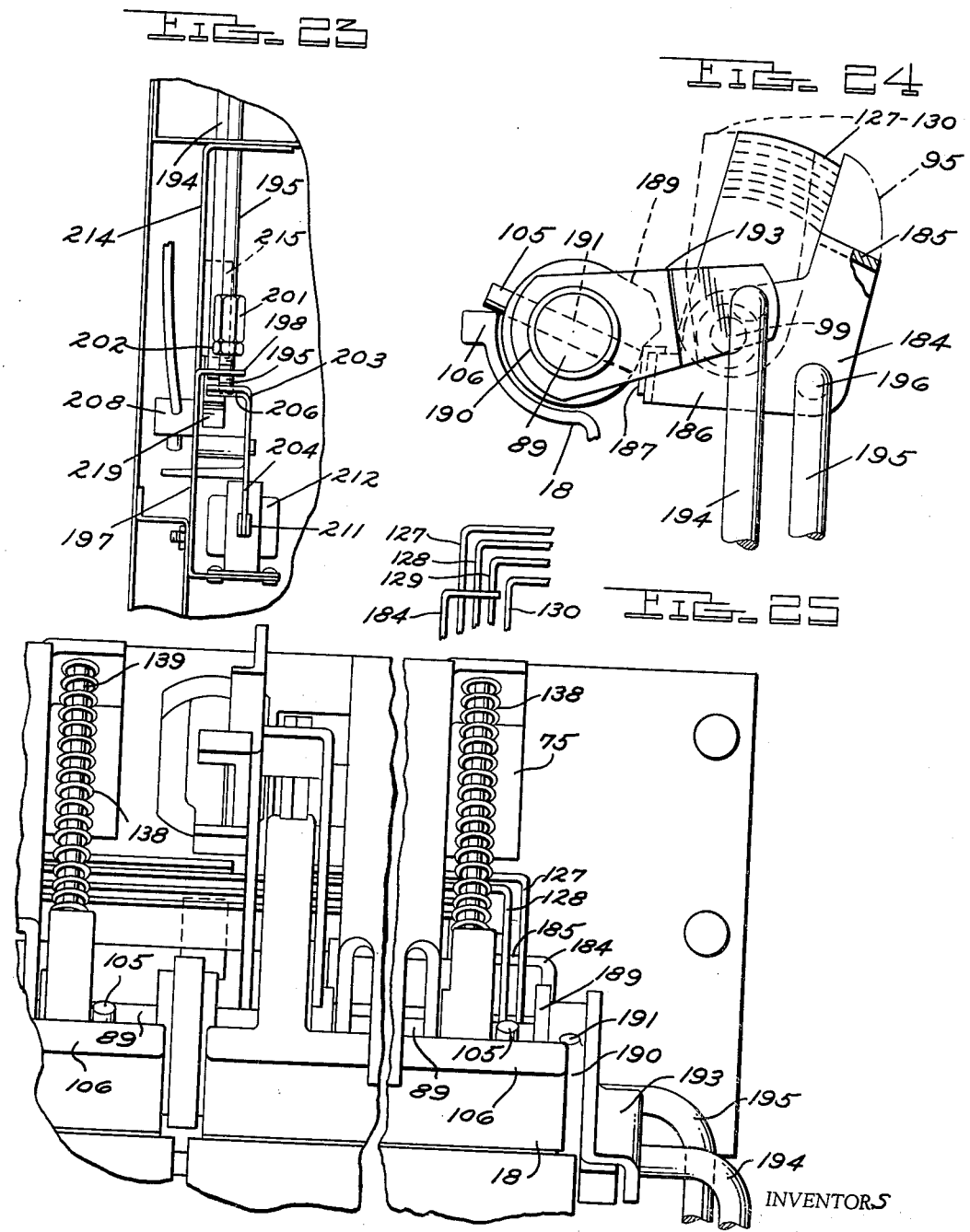
INVENTORS
ELMORE L. ZIBBELL
BY OSCAR C. HANSEN
ATTORNEYS United States Patent Office
3,205,994
Patented Sept. 14, 1965

3,205,994
MECHANICAL CAN VENDING SYSTEM
Elmore L. Zibbell, Redford, and Oscar C. Hansen, Detroit, Mich., assignors to Ferro Manufacturing Corporation, a corporation of Michigan
Filed Apr. 1, 1963, Ser. No. 269,254
20 Claims. (Cl. 194—10)

The present invention relates to an improved mechanical can vending system or apparatus which is characterized by the simplicity and economy of its parts, as well as by the simplicity and readiness or handiness of the operation of the machine by a prospective purchaser of one of a number of different flavors of canned fruit beverage that are dispensed by the machine.

It is an object of the invention to provide a can vending system as described which completely dispenses with the usual type of push-pull knobs which have to be manipulated by the purchaser, following deposition of coinage of a suitable value in a coin control device of the apparatus. That is, the purchaser simply deposits a coin or coins of proper value, then proceeds to lift one of several (for example, four) doors which normally are held in covering relation to the discharge ends of columns or chutes in which the various beverage flavors of canned product are stored; and the simple act of lifting the door a few degrees about its pivotal mount, once coinage is deposited, at once initiates a selection and can discharge operation which results in the can rolling out the column to a point for removal by the purchaser.

Another object is to provide a dispensing mechanism as described, which is proof against possible dispensing of a can or cans in the absence of proper coin value deposited in the coin collector device with which the mechanism is intended to be associated. Furthermore, the machine is such as to make it impossible for a user, upon depositing coinage for a single selected beverage or flavor, to manipulate the apparatus in a manner to obtain the delivery of more than the single selected item. In other words, for the deposition of a certain coinage value for a single selection, only a single can can possibly be delivered.

Another object is to provide a vending machine or system, in which it is made impossible, in the event a given can storage column is depleted of its supply, for the user to make a selection at that column by the manipulation of its associated column-closing door. The latter is blocked rigidly against more than a few degrees of initial opening movement; and in any event, the depletion of the column automatically results in the display of a "Empty" caption, warning the user of this condition; and if he has already deposited coinage, he may obtain its value by operating another column door to obtain another flavor. In the event all columns are depleted of cans, the coin control unit associated with the present mechanism is of a type to automatically return the deposited coinage, although this is a feature of the coin control mechanism, with which the present invention does not deal and which, accordingly has not been illustrated or described.

More specifically, it is an object of the invention to provide a can dispensing apparatus or system which consists, essentially, of two basic components, i.e., an escapement and can discharge mechanism or sub-assembly of noval and improved character, and an automatic, door-actuated selector assembly or mechanism, also improved and novel in design and operation.

In accordance with this aspect of the invention, the escapement sub-assembly includes a series of coacting escapement elements which are positive and foolproof in operation, making it impossible for a user to "jack-pot" the machine to obtain the delivery of a plurality of cans from a given column in one cycle of operation following the deposition of coinage only sufficient for a single delivery. Assuming the presence of proper coinage in the coin control device, the escapement and discharge mechanism provides a positive discharge to a purchaser of the forward-most can of a given, selected column, simultaneously accompanied by a positive setup of a following can for delivery in a subsequent cycle.

In connection with the selector sub-assembly or mechanism, it is characterized by an improved type of pivoted, bell crank-type ratchet or blocking dog, whose function is to block further opening swing of a column door after a few initial degrees, in the event proper coinage has not been deposited or the column is empty of cans. However, assuming proper coinage is present in the coin control device, this blocking dog is shifted to a position in which the door may be opened, for the completion of a full selection and can discharge cycle.

For the above purpose, the invention provides a thrust link pivotally mounted upon a boss of the door, this link being engageable with the blocking dog upon a few degrees of lift of the door to elevate the dog out of its normal door-blocking position. In order to enable the dog to remain in such position, however, in the event of an empty can column or a "no coin" condition, the mechanism includes a lifter arm responsive to such conditions to shift the thrust link to a position to disable the same for engagement with the blocking dog. The thrust link thus overruns or "free wheels" the blocking dog in the initial swing of the door; and the boss of the latter immediately thereafter strikes the blocking dog and is halted by the latter from further opening swing.

A still further object is to provide a machine or system having a selector sub-assembly of the character just referred to, which incorporates a series of nested tumblers responsive to initial opening of the door to cause one of the lifters to remain in an inoperative position, while shifting the remaining three lifters to the thrust link-disabling position mentioned. In accordance with one embodiment of the invention, provision is also made whereby, in the event of non-deposit of coinage, all tumblers will be automatically operated in a manner to shift all lifters in the manner described, with the result that all four blocking dogs remain in operative, blocking position, and none of the column-closing dispenser doors may be further lifted to complete the opening and selection cycle.

In accordance with another and preferred embodiment of the invention, provision of a structurally simple nature is made, whereby prior to the insertion of proper coinage in the coin control mechanism all of the lifters are held in their disabling position referred to above, by means of a simple locking lever having an offset portion adapted to engage a certain number of the tumblers prior to deposit of coinage. The locking lever is sustained in its position in which, through the agency of two or more tumblers, it holds all four lifters in link-disabling position, by means of a latch abutment lever and rod operatively connecting such lever to the locking lever. The latch abutment lever is solenoid-connected to the coin control mechanism which, upon deposition of proper coinage energizes a solenoid, with the result that the latch abutment lever is withdrawn from an operative position to hold the locking lever in its operative position. The latter then falls away from such operative, locking position, with the result that any selected door can be lifted to obtain access to the bottom can in its chute or column, its tumblers straddling its lifter so that its blocking dog can be engaged by its thrust link to shift the dog to non-blocking position; while all three other blocking dogs will be left in blocking position.

In other respects, the two embodiments of the invention mentioned above are practically identical, in so far as their respective selector mechanisms are concerned. They differ only in their response to a condition of non-deposit of proper coinage in the coin control mechanism. Thus, in the first described embodiment, the action is based upon the fact that with no coinage present the tumblers are operated with the result that all thrust links are shifted from a non-disabled position to a disabled position; whereas in the second and preferred embodiment all of the tumblers are locked in a position to cause all of the thrust links to be disabled, prior to deposition of coinage and prior to manipulation of a selected door. Only when coinage is deposited does an electrical signal release the lock tumblers, to in turn release the thrust links to return to their non-disabled position, from which all except one are re-returned to disabled position when the selected door is lifted.

In still further accordance with the invention, the apparatus incorporates an improved "Empty"-"Select" sub-assembly whereby, as indicated above, the absence of cans in a dispensing column will be clearly signalled to the user by exposing a suitable indicium through a forward viewing window of the apparatus. Furthermore, when the vending apparatus as a whole is depleted of all cans to be vended, provision is made to originate a signal at the column from which the final can is dispensed to disable the coin control mechanism from accepting further coinage.

Therefore, another object of the invention is to provide an apparatus or system for vending cans and like merchandise, in which there are incorporated provisions which, in the absence of a can in any given column, will block the selector mechanism of that column from further operation until cans are replenished therein; which will cause the empty condition to be visually indicated to the purchaser; and which in the event of the total absence of cans in the apparatus will disable the coin control mechanism from accepting further coinage.

Moreover, in either embodiment of the invention, it is an object to incorporate with such "no-can" provisions, means of one sort or another to disable all selector mechanisms from vending a can in the absence of the deposition of proper coinage in the coin control mechanism.

The foregoing as well as other objects will become more apparent as this description proceeds, especially when considered in connection with the accompanying drawings illustrating the invention, wherein:

FIG. 1 is a fragmentary side or end elevational view, as from the left of FIGS. 3 and 4, being partially broken away, this view showing basic components of the subject system or mechanism, and indicating in solid and dotted line successive positions of certain moving parts of escapement and selector sub-assemblies;

FIG. 1A is a view in horizontal section on line 1A—1A of FIG. 1;

FIG. 1B is a fragmentary end elevational view somewhat schematically showing a "machine-empty" signal device incorporated in the mechanism, positions of certain components thereof when the vending system as a whole is empty of cans or contains at least one can to be vended being indicated in solid and dotted lines, respectively;

FIG. 1C is a front elevational view of the machine-empty signalling device referred to;

FIG. 2 is a fragmentary view similar to FIG. 1 illustrating escapement and can-discharge parts in a final position, in which a selected can is discharged from its storage chute or column;

FIG. 3 is a fragmentary top plan view of the selector mechanism, partially broken away and in horizontal section, with insulated cabinet provisions being omitted;

FIG. 4 is a fragmentary front elevational view of the apparatus;

FIGS. 6 and 7 are, respectively, side and rear elevational views of a portion or sub-assembly of a can discharge device of the escapement and can-discharge mechanism, essentially in the form of a combined can discharge scoop and column closure door structure;

FIGS. 10 and 11 are, respectively, side and front elevational views of a pawl lifter arm component of the selector unit or sub-assembly, which arm is also mounted by the bracket of FIGS. 8 and 9;

FIGS. 12 and 13 are, respectively, side and rear elevational views of a "Select-Empty" indicator device of the selector mechanism, which device is carried by a basic mounting bracket of the machine;

FIGS. 14, 15 and 16 are, respectively, side, front and top plan views of another unit of the selector sub-assembly as carried by the basic mounting bracket this unit including one embodiment of the contemplated means for disabling the selector for dispensing action in the absence of a coin deposited in a coin controlled device with which the system is to be associated;

Figure 5:
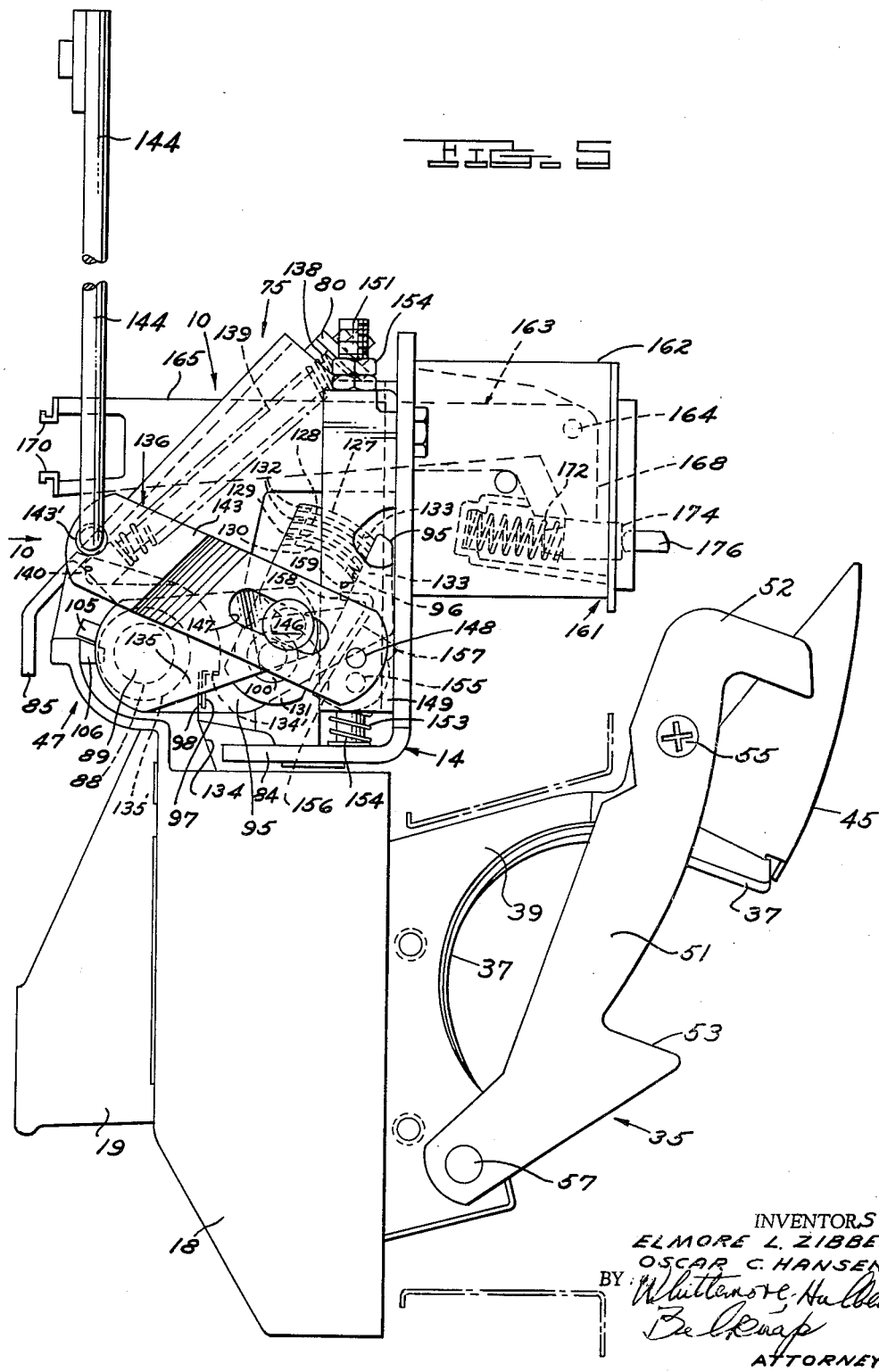
FIG. 5 is a further view in end or side elevation, as from the right of FIGS. 3 and 4.

FIG. 17 is an end elevational view, as from a direction corresponding to the right of FIG. 4, showing a preferred embodiment, alternative to that appearing in FIGS. 5, 14, 15 and 16, for disabling the selector unit from dispensing action prior to the deposition of proper coinage in the coin control device, this arrangement involving means for positively locking all tumblers from action prior to coin deposition;

FIGS. 18 and 19 are fragmentary end elevational views similar to FIG. 1 (hence of use in connection with that figure for an understanding of structural characteristics of the selector mechanism), these two views respectively showing the position of the selector parts when the coin-controlled mechanism of FIG. 17 is respectively in its locked and unlocked conditions, prior to manipulation of a selected door;

FIG. 20 is a fragmentary top plan view partially broken away and in horizontal section, showing connections of the coin responsive unit of FIG. 17 to other parts of the selector mechanism, this view being somewhat similar to what is shown at the right of FIG. 3;

FIG. 21 is a fragmentary end elevational view showing a locking cam and return arm sub-combination of the coin-controlled combination of FIGS. 17 and 20;

FIG. 22 is a front elevational view, somewhat similar to FIG. 4 in part, further illustrating features of the coin responsive "no-coin" locking provisions;

FIG. 23 is a rear elevational view of a part of the mechanism shown in FIG. 17, i.e., from the right of that figure;

FIG. 24 is a side or end elevational view showing the cam and return arm sub-assembly of FIG. 1 as associated with a locking lever and tumblers, the tumblers being indicated in dotted line in the position in which they are held by the lever prior to deposition of proper coinage in the coin control mechanism; and FIG. 25 is a fragmentary view in rear elevation, or from the right of FIG. 24, showing the positional relationship of the locking lever and tumblers.

The present can vending machine is adapted to be combined with a known type of coin operated control device which, upon depositing of an appropriate denomination of coin or coins in a coin slot will, through the agency of a rod or link to be described, enable the performance of a full single operating cycle by the selecting and can escapement mechanisms of the invention. On the other hand, in the absence of an appropriate coin or coins in the coin control the motion of the rod or link referred to is of only partial length, with the result that selector instrumentalities remain blocked to prevent the discharge of a can from any of a number of storage columns, each governed by selector and escapement sub-assemblies according to the invention. Coin control devices having a motion limiting action of this sort are known to the art and constitute no part of the present invention, hence such device is illustrated only as to the control rod or link means which connects to the selector.

The subject system or mechanism essentially comprises the two assemblies, i.e., selector and can escapement and discharge, which are mounted in a compact space in bracket means of a suitable refrigerated cabinet structure (not shown in detail). Each services one of a number of like parallel serpentine or zigzag can storage columns, racks or chutes which are arranged in upright side-by-side relation to one another within the cabinet and discharge in side-by-side relation forwardly of the cabinet. The latter is of a more or less conventional, refrigerator type nature hence has not been shown other than in regard to certain basic and parts mounting bracket means carried thereby, and it will be understood that, as to components other than those mounted by such bracket means, the cabinet affords suitable provision (not shown) for appropriately mounting them also, fixedly or movably, as the need may be. Suitable provision is made to swing a forward insulated cabinet door away from the remainder of the cabinet structure for access to and servicing of such mechanisms as are disposed behind the cabinet door.

The two basic operating sub-assemblies for each can storage column are, as best shown in FIGS. 1, 3 and 4, a selector device 10 and an escapement and can discharge mechanism 12; and these are governed in part by certain tumbler means and "anti-jackpot" means common to the columns, as will be described.

The reference numeral 14 designates a basic mounting bracket of sturdy elongated angle iron construction which extends horizontally of the full transverse width of a series of chutes or columns 15 from which cans are to be dispensed, being located at or just forwardly of the discharge ends of the columns 15. The latter each terminate forwardly in a mildly upturned can restraining lip 16; and it will be understood that the portions designated 15 and 16 represent the forward and bottom ends of can storage columns, chutes or racks which are individually of a conventional nature, down which cans gravitationally travel a serpentine or zigzag path as the forwardmost can is discharged by its escapement and discharge mechanism 12.

The mechanism 12 is characterized by its compactness and economy as to number of parts. These parts, as best illustrated in FIGS. 1, 2, 6 and 7, are, as to those which have an essential escapement action, appropriately pivoted on suitably fixed portions of the cabinet. Others, primarily the escapement actuator and terminal can discharge components of assembly 12, are fixedly mounted each to a series of like doors 18 normally covering the mouths of the columns 15. Each door has fixedly associated therewith an appropriate forward handle piece 19.

Thus, as shown in FIGS. 1, 2 and 3, the basic escapement parts of the mechanism 12 comprise a can stop member 21 comprised of a bail-like element 22 and, in fixed relation thereto, an operator 23 therefor, the bail element 22 being pivoted to the cabinet structure at 24 and having an integral cross piece 25 adapted to extend across the path of travel of cans C in the column 15; an actuator lever or member 26, likewise of two-part construction including an arm element 27 carrying a transversely elongated escapement stop lip 28 and, in fixed relation to element 27, an operator element 29 for the can stop member 21, the elements 27, 29 being pivotally mounted at 30 on the cabinet structure; and a generally diamond-shaped actuator plate 32 for the member 26, this actuator plate being pivoted on the cabinet structure at 33. The stop lip 28 of member 26 is of a width, as it projects across the gravity path of discharge of the cans C in its fully elevated condition of FIG. 2, sufficient to afford a barrier to further advance of a can just behind it.

Further structural features of the escapement components 21, 26 and 32, as well as their functioning relationships, will be hereinafter referred to. The elements 23, 29 and plate 32 are in close side-by-side overlapped relation to one another in each sub-assembly 12, and may be considered to swing in a plane just outwardly of a vertical side of the associated column or chute 15. As indicated above, the elements 25 and 28 are can stops which project well across the can path.

The can stop member 21 also has a bracing cross strap 21' which has the further function of bridging from above the path of can travel along column 15, and thereby preventing any tendency of a line of cans to buckle upwardly under front-rear compression such as might cause jamming.

The escapement and can discharge assembly 12 also includes, as best shown in FIGS. 1, 2, 6 and 7, a discharge scoop and escapement actuator or control device, generally designated 35, having a unitary action. As best shown in FIGS. 6 and 7, the device 35 comprises a sheet metal scoop member 37 including a can-receiving portion 37' of generally semi-cylindrical outline flaring divertently to the rear and downwardly. This member 37 is of an axial width approximating the axial dimension of a can C to be vended. It is secured by rivets 38 to an appropriate stamped mounting piece or bracket 39 of approximate half-moon shape at one of its axial ends; and the bracket 39 is secured, adjacent the top of scoop 37, to the rear of the door 18 by bolts 40, which take into bosses 40' of the door. Further bolts 41 similarly secure a bottom offset flange of sheet metal scoop 37 to the door. The door is in the form of an appropriate, internally hollow casting, and has the grip piece or handle 19 bolted to the upper forward portion thereof.

A mildly arcuate guard member 45 is fixedly carried on the upper rear extremity of the scoop 37, being convex to the rear and approximately coextensive in axial dimension with the scoop and the column 15 with which the assembly 12 is associated. The function of the guard will be hereinafter referred to.

At its upper forward end, the door 18 is provided with an enlarged integral bearing boss, generally designated 47 (FIGS. 3, 5, 6 and 7), which coacts with parts of the selector assembly or mechanism 10 in a manner to be described.

Returning to the actuator and can discharge aspects of the escapement assembly 12, the scoop device 35 has mounted on its side bracket 39 an escapement actuator cam arm 51, which is in the same general upright front-to-rear extending plane as the escapement elements 23, 29 and 32 referred to above. Arm 51 is formed to provide a rearwardly directed actuator cam or hook 52 and, in downwardly spaced relation thereto, an abutment edge shoulder 53.

Arm 51, though fixed on side bracket 39, is mounted for longitudinal adjustment upon the latter, and relative to the scoop 37, by means of a screw 55 extending through an elongated slot 56 adjacent the top of the bracket, with a nut applied to the screw to lock arm 51 firmly to the bracket 39 as a unitary component of the scoop assembly 35. At the lower end thereof, the arm 51 is provided with a pin or rivet 57 extending through an elongated guide slot 58 at the bottom of bracket 39. This adjustment enables a proper initial setting of actuator arm 51 relative to scoop 37 for the desired actuation of escapement members 21, 26 and 32 from discharge scoop device 35.

Again referring to FIGS. 1 and 2, element 23 of can stop member 21 is provided with a downwardly and forwardly opening notch 61 defined in part by a mildly concave guide surface 62. The notch 61 accommodates an anti-friction roller 64 extending transversely from a side of the element 29 of escapement stop member 26. The element 29 also carries a transversely extending pin or roller 65 which is receivable in a rearwardly opening arcuate recess 71 in an edge portion of the diamond-shaped actuator plate 32. Below the recess 71 the edge 72 of actuator plate 32 is mildly convex downwardly and to the rear. The plate 32 also carries a transversely extending stud or pin 73 at its upper and forward apex, this pin normally, in the non-actuated condition of the assembly 12, resting upon the stop shoulder 53 of the escapement acuator arm 51, as shown in solid line in FIG. 1.

Assuming that a suitable coin denomination has been deposited in the coin control mechanism (not shown) with which the present machine is associated, a lifting of the door 18 to swing the same about upper pivot means at its boss 47 (to be described), thus initiating operation of the selector mechanism or assembly 10 in the manner also to be described, will cause the scoop-carried escapement actuator arm 51 to travel counterclockwise about such pivot means as an axis, i.e., downwardly and forwardly from its solid line position to its instantaneous dotted line position in FIG. 1, during which the cam or hook part 52 thereof is brought against the transverse pin 73 at an apex of the actuator plate 32 to swing the latter from its solid line to and through its dotted line position.

The effect of this is to cause the notch 71 of actuator plate 32, in engaging the pin or roller 65 of the escapement stop member 26, to shift the latter from its solid line position to its dotted line position (FIG. 1); and this brings the roller 64 on element 29 of member 26 into the root of the recess 61 in the two-part bail member 21. However, at this time, the transverse bail part 25 of the member 21 still remains in its solid line obstructing relation to the second bottom-most can in the column 15, assuming that the bottommost can is being discharged by scoop assembly 35 as the above mentioned motions of the escapement parts commence and continue.

A full continued swinging of the door 18 about its pivot at the boss 47 causes the actuator arm hook 52 to continue the movement of actuator plate 32 in clockwise direction (FIGS. 1 and 2) about its pivot at 33; and, through the successive agency of plate 32 and escapement stop member 26, causes can stop member 21 and its bail 25 to be lifted clockwise about the pivot of the member 21 at 24 to the position of the parts shown in FIG. 2 of the drawings. As this happens, of course, the scoop 37 is engaging and positively discharging the lowermost can C out of the mouth of column 15, i.e., from the position at which the can was temporarily restrained by the column lip 16, as illustrated in FIG. 1 of the drawings.

With the door 18 fully open to expose the forward dispensed can C, and with can stop bail 25 and stop lip 28 fully elevated to the positions shown in FIG. 2, the second can C in the column rolls beneath bail 25 and against stop 28, by which it is held in place until the door 18 is returned downwardly to column-closing position. When this happens, bail 25 is interposed between the halted can and the now second can to restrain the latter in the position of FIG. 1, the now foremost can coming to rest against column lip 16.

As illustrated in FIG. 2, the guard 45, at the time the forwardmost can C is being discharged, is in a position to prevent jamming in the event the can is not ejected but an attempt is made to force it back into position.

As shown in FIG. 2, the convex edge 72 of actuator plate 32 is engaged forwardly of the pin 65 on escapement stop member 26 to hold the bail 25 of can stop member 21 in its elevated position (FIG. 2) until the second can C has had a chance to roll down chute 15 and be halted by the wide escapement stop lip 28 of member 26. The escapement parts are returned to their position shown in solid line in FIG. 1 (indirectly by spring means acting upon the door 18 in a manner to be described), whereupon the second can now rolls forwardly against scoop 37 and onto the column lip 12, where it remains pending a further actuation of the door and discharge scoop device 35.

Figure 9:
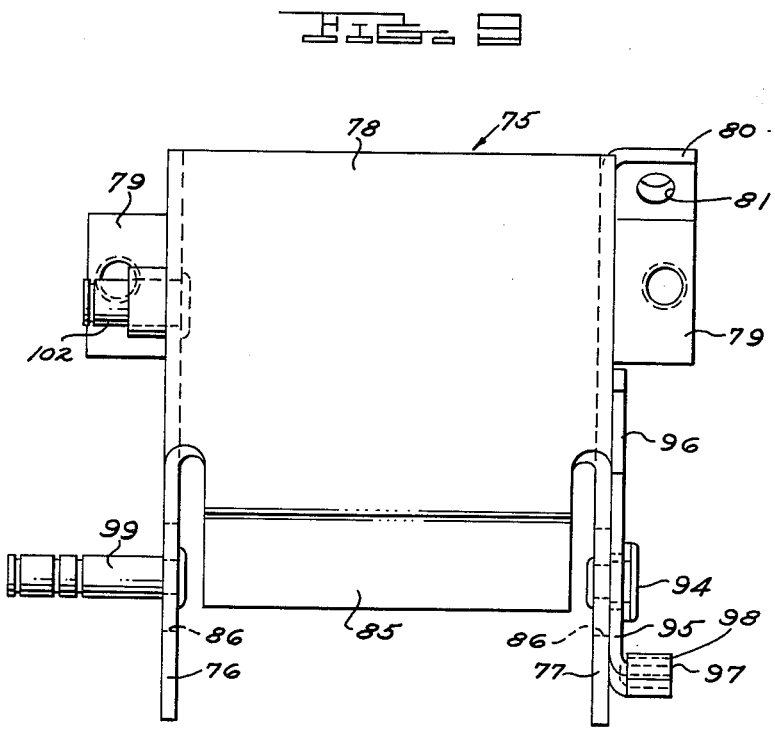
FIGS. 8 and 9 are, respectively, side and front elevational views of a mounting bracket for certain parts of the selector unit of the mechanism, showing a tumbler control or lifter lever assembled to the bracket.
Figure 8:
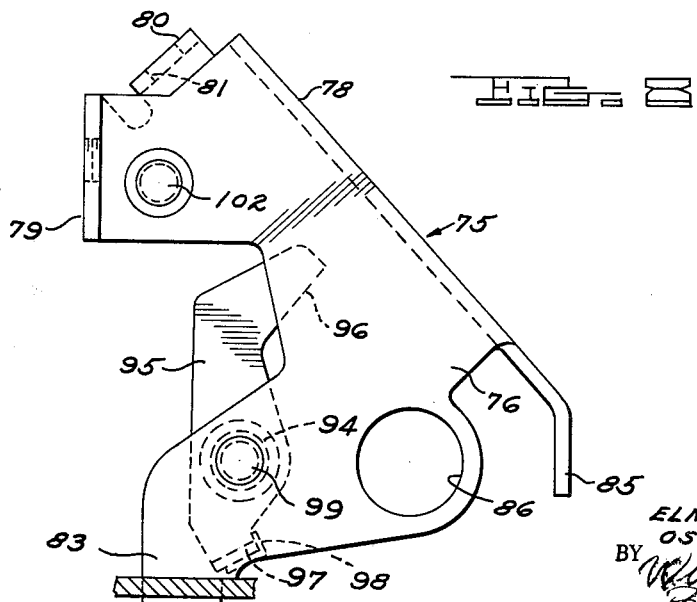

Now referring to FIGS. 8 and 9 in conjunction with FIGS. 1, 3 and 5, each of the selector assemblies or mechanisms 10, one for each column or chute 15, is mounted upon a rugged parts mounting bracket, generally designated 75. This bracket is mounted to the basic bracket 14, in a manner to be described, and is of roughly U-shaped outline in plan. It includes a pair of parallel side flanges 76, 77 bridged and reinforced by an integral cross plate 78 of generally rectangular outline; and the flanges 76, 77 are formed with oppositely outwardly projecting ears 79 by which the bracket 75 is secured by bolts 79′ to the basic bracket 14, in the manner illustrated in FIG. 3. In addition, one flange 77 of bracket 75 is provided adjacent its top and rear with a laterally offset inclined ear 80, this ear affording a pilot aperture 81 for certain spring means (to be described) by which the door 18 and parts operated thereby are biased.

At the bottom and rear portion thereof, each parts mounting bracket 75 is provided on its flanges 76, 77 with stabilizing feet 83 resting upon a forward lower horizontal flange 84 of the basic mounting bracket 14. The rectangular bridging part 78 of the bracket 75 terminates forwardly in a downwardly disposed shield extension 85.

As shown in FIGS. 3, 8 and 9, the flanges 76, 77 of each bracket 75 are provided, adjacent the forward and lower edges thereof, with transversely aligned circular openings 86 in each pair of which an elongated tubular bushing sleeve 88 is fixedly received; with a elongated rod or shaft 89 extending through the successive sleeves 88. The shaft 89 is of a length equal to the full transverse width of the mechanism across the several columns 15 of the latter; and at the left-hand end thereof (FIG. 3) a pin 90 extends through the shaft 89 to restrain end play of the latter in this zone. Certain lever means to be described serves the same restraining function at the opposite end of shaft 89.

Each handle boss 47 is integrally formed to provide an enlarged journal portion 92 rotatable upon a sleeve 88; and the boss 47 is in this journal zone also provided, as appears in FIG. 1, with an integral, upwardly extending actuator extension 93, for a purpose to be described.

Again referring to FIGS. 8 and 9, the flanges 77 of all except one of the mounting brackets 75 are provided with a pin or stud 94 acting to pivot on the external side thereof a tumbler operating lever 95. The remaining bracket 75, i.e., that at the extreme right of FIG. 3, has this function performed by a different type pin, as will be described. The lever 95 is at its top formed to provide a forwardly and upwardly inclined tumbler engaging face 96, being laterally outwardly offset at its lower end at 97. A small clip 98 is affixed to this offset.

As best illustrated in FIG. 3, the several parts mounting brackets 75 are equipped with a laterally outwardly projecting pin 99 on the flange 76 thereof, directly rearwardly of its journal or bearing opening 86; and the extreme right-hand bracket 75 is equipped with a similar pin 100, in this case on the right flange 77 of the bracket, the pin 100 in this instance serving the function of the other flange pins 94 in pivoting the tumbler actuating lever 95 of the assembly 10 in question.

Finally, each parts mounting bracket 75 is provided on its flange 76 as shown in FIGS. 1, 3, 8 and 9, with a laterally outwardly projecting stud 102, the function of which is to pivotally mount a handle blocking ratchet dog, to be described.

It has been noted, and best shown in FIGS. 1 and 3, that each door 18 has its enlarged boss 47 pivoted at the bearing portion 92 of the latter upon a sleeve 88 sustained by the flanges 76, 77 of the parts mounting bracket 75 of the assembly 10. The transverse elongated shaft 89, as journalled within the respective sleeves 88, is provided, just outwardly of the sleeves and right-hand bracket flanges 77, with radially extending pins 105; and each door boss 47 is further provided with an integral actuator abutment 106 in this zone which is adapted, upon swinging the door 18 counterclockwise, as viewed in FIG. 1, to engage a pin 105 and exert torque upon the shaft 89 tending to rotate the same in the same direction, or clockwise, as viewed in FIG. 5.

This occurs after about 11° of free swinging action of the door, during which time the apparatus is responsive to the presence or absence of a suitable coin or coins deposited in the coin control device (not shown) to determine whether the mechanism or sub-assembly 10 shall operate further to cause its assembly to dispense a can, or shall be blocked, in the absence of a coin, from so operating.

The parts involved in this determination involve for each mechanism 10, the integral upward extension 93 on each door boss 47 (FIG. 1) which, in the 11° travel referred to above, is adapted, in the absence of a coin, to come into engagement with a blocking shoulder 109 on a bell-crank shaped blocking or ratchet dog member 110. This dog is freely pivoted upon the pin 102 of the flange 76 of parts mounting bracket 75.

Reference may also be had in this connection to FIGS. 18 and 19 of the drawings, showing parts identical to those appearing in FIG. 1, although controlled in a somewhat different manner in respect to the locking of the mechanism against operation in the event no coin has been deposited.

The ratchet dog member 110 includes a short operated arm 111, and a spring 112 acts between an ear 79 of the bracket 75 and the forwardly projecting arm 113 of dog member 110, which arm carries the blocking shoulder 109, to urge the arm clockwise (FIG. 1) about its pivot on pin 102. Thus, with the bell crank dog member 110 thus urged, the door 18, if not a selected one or in the event coinage has not been deposited, is blocked at its upward extension 93 against further counterclockwise movement (FIG. 1) about its pivot on sleeve 88. Hence the escapement and discharge sub-assembly 12 is not actuated through the agency of the actuator arm 51 carried by the door-mounted scoop device 35, the parts of escapement mechanism 12 being stopped in the position shown approximately in dotted line in FIG. 1 of the drawings.

However, in the presence of a coin deposited in the coin control device (not shown), provision is made to raise the bell crank ratchet dog member 110 counterclockwise (FIG. 1) about its pivot on pin 102. Such provisions take the form of a thrust or ratchet dog lifter link 115, which is pivoted by a pin 117 upon the boss 47, beneath the upright boss extension 93. The link 115 extends rearwardly and upwardly, terminating in an offset actuator lug 118 which, when a coin is deposited and a selected door 18 is lifted, is adapted to engage the operated arm 111 of ratchet dog member 110, thus to swing the latter upwardly, or counterclockwise as viewed in FIG. 1, to an unblocking position in relation to the boss extension 93 on door 18. This frees the door for a continued counterclockwise movement (FIG. 1) about the sleeve 88 as a pivot; with the result that the door-carried actuator arm 51 operates the linkage including members 32, 26 and 21 of escapement and discharge mechanism 12 to first cause scoop device 35 to discharge the leading can C and then permit the next following can to come into position at the column lip 16, to be dispensed upon a further coin-controlled operation of mechanism 10.

It follows therefore from the foregoing that the invention contemplates provision to shift the thrust or ratchet lifter link 115 out of position for its lug 118 to operate and lift dog member 110 in the absence of a coin deposited. For this purpose, each mechanism 10 includes a lifter arm 120 (see FIGS. 10 and 11 in conjunction with FIGS. 1 and 3). These arms have apertures 121 at the lower ends thereof to pivot the same on the pins 99 of the several parts mounting brackets 75, i.e., coaxial of the pivoted mounts at pins 94 and 100 for the tumbler actuating levers 95. Each lifter arm 120 is formed to provide an angular slot 122 adjacent the top thereof, and is provided with a 90° offset lug or flange 123 for a purpose later described. The lug 118 of thrust or ratchet lifter link 115 terminates in a reduced portion 124 which wise shift of member 120 about its pivot at 99, as viewed extends through the slot 122; so that, upon a slight clockwise shift of member 120 about its pivot at 99, as viewed in FIG. 1, the lug 118 of link 115 will be lifted out of position for engagement with the actuated arm 111 of bell crank ratchet dog member 110.

This signifies that a rotation of the shaft 89 upon swinging of the door 18 will, in the case of all non-selected mechanisms 10, simply result in the lug 118 overrunning or "free-wheeling" relative to the actuated arm 111 of dog 110, so that the dog remains in position to block door movement at the door boss extension 93. The respective lifter arms 120 are each urged counterclockwise, as viewed in FIG. 1 about the respective pivots thereof at 99, by means of a spring 125 encircling the respective pivot pins 99.

Each ratchet blocking dog 110, in addition to the primary blocking shoulder 109, is provided with a secondary stepped shoulder 126 to the rear thereof. Thus, should the door 18 be partially lowered clockwise (FIG. 1) the shoulder 126 will prevent an attempt to re-lift the door, by again blocking the boss extension 93.

A series of similar nested tumbler members are provided to control the action of the lever arms 120. There are four of these tumblers, respectively designated 127, 128, 129 and 130 in FIGS. 1, 3 and 5, for a system or machine incorporating four dispensing columns 15. Each tumbler is of a U-shaped bail-like outline, being elongated in the direction of and across the successive transversely arranged chutes or columns; and the short end arms 131 of the tumblers are respectively pivoted on the pins 99 and 100 (FIG. 3) of the outermost parts mounting brackets 75, these pins, as indicated before, projecting oppositely from the respective flanges 76 and 77 of the endmost brackets 75 in question.

As indicated best in FIGS. 4 and 5 of the drawings, each of the tumblers 127–130, inclusive, is provided with a single slot or gap 132 in its edge facing, and in the immediate transverse zone of, one of the lifter arms 120, but is unslotted otherwise in the zones of the three remaining arms 120. Likewise, each tumbler has its rear edge slotted at 133 (FIG. 5) in the transversely spaced zones thereof in which it is behind the three lifter arms 120 other than the one for which, alone, it is slotted at 132. Thus, as each of the series of tumblers 127–130 is rocked clockwise (FIG. 1) about its pivot on pins 99, 100 (through the agency of one of the actuator levers 95, as will be described), the slot 132 of the selected tumbler will straddle the selected lifter arm 120 (see FIG. 4) and that arm will be unaffected. However, the remaining three lifter arms 120 will be engaged from the rear by the remaining unslotted forward edge of the selected tumbler, and will be swung forwardly or clockwise from the position of FIG. 1. This causes a lifting of the three remaining thrust links 115, and a disabling of the lugs 118 thereof from swinging the respective non-selected blocking dog members 110 from position to block the respective door boss extensions 93. Thus any attempt to open more than one of the doors is blocked by the dogs 110 associated with the non-selected assemblies 10. Any movement of any one or more doors more than about 11° automatically blocks further opening movement of all except one of the doors.

Each of the tumblers 127–130 is swung in the manner described by one of the several tumbler actuator levers 95, the faces 96 of which engage the unslotted rear edges of the tumblers. As appears in FIG. 5, each door 18 is provided, on a side thereof is transversely or axially spaced relation to its boss journal portion 92, with a further integral boss 134 similarly journalled on the sleeve 88; and each boss 134 has a downwardly facing shoulder 134' engageable with the clip 98 on the offset flange 97 of a tumbler actuator lever 95. Thus, as the selected door is swung clockwise (FIG. 5) the shoulder 134' pivots the associated lever 95 counterclockwise about its pivot at pin 94 or 100; and this also swings the associated tumbler counterclockwise about its pivot at pins 99, 100.

Referring now to FIG. 5 in conjunction with FIGS. 3, 14, 15 and 16, there is shown therein a linkage sub-assembly responsive to movement of the shaft 89, and also to the condition of the coin control device (not shown), to prevent opening any door 18 in the event a coin deposit has not been made at the coin control. The reference numeral 135 in this sub-assembly designates a crank arm fixedly pinned at a boss 135' thereon to the right-hand end of the shaft 89, as viewed in FIG. 3, this crank being therefore responsive in movement as the lugs 106 of any of the door bosses 47 upwardly engage a shaft pin 105. Its function in the "no-coin" responsive sub-assembly, generally designated 136, will be hereinafter described.

The motion of the selector parts described, as well as the escapement and discharge parts of mechanism 12, is resisted by coil compression springs 138, one for each sub-assembly 10, which, as illustrated in FIGS. 3, 4 and 5, surround pilot stems 139 extending upwardly at an angle through the apertures 81 of the ears 80 on each parts mounting bracket flange 77.

The linkage 136 is provided for coaction with the crank or shaft arm 135 (see FIGS. 3 and 5 in conjunction with FIGS. 14–16) in the control of the sub-assemblies 10 and 12 from the coin control device (not shown). This linkage comprises an operating arm 143 having its outer extremity pivotally connected at 143' to the lower end of an operating rod or link 144 which extends upwardly and is operatively connected in a known manner to the coin control mechanism associated with the present apparatus. Although it constitutes no part of the present invention, the coin control in question is one in which, if an appropriate coin has been deposited, the link 144 may have a full downward stroke, permitting the shoulder 134' of the door boss journal part 134 (FIG. 5) to operate the tumbler actuating lever 95 in the manner described above. However, in the event no coin has been deposited, the operation of the coin control device is to halt movement of the rod or link 144 after but a partial downstroke, with the effect to be described. This occurs within the first 11° of arcuate movement of shaft 89 and the actuator arm 135 pinned thereon.

Crank arm 135 is provided at its outer end with a pin 146 received in an elongated slot 147 in the operator arm 143; and the latter is, at its end opposite its connection at 143' to link 144, pivotally mounted by a pin 148 to a spring cage 149 (see especially FIGS. 14, 15 and 16). This cage comprises a channel-shaped stamping providing a housing mounted for vertical movement in relation to and about an elongated upright stud 151 carried by the flange 84 of the basic mounting bracket 14. Cage or housing 149 has a forwardly offset top flange 149'.

Coil compression spring 153 surrounds stud 151 within the housing, its lower end resting upon the bracket flange 84; and the spring upwardly abuts the top flange 149' of the cage housing. Stop nuts 154 are threaded upon the end of stud 151 above flange 149' to restrain upward movement of the cage.

It is seen from the above that, with the force of spring 153 appropriately chosen to sustain the pivot of arm 143 to cage 149 at pin 148, if a coin is present in the coin control device, clockwise rotation of shaft-carried crank 135 upon lifting of the cover 18 (by engagement of boss lug 106 with a shaft pin 105—FIG. 5) will simply result in a counterclockwise motion of arm 143 about its pivot pin 148, as the coin control mechanism (not shown) permits rod or link 144 to travel downwardly a full stroke. The tumbler actuating lever 95 swings counterclockwise about its pivot at a pin 94 or 100 as contemplated by the invention.

If, however, a coin has not been deposited in the coin control device, the latter abruptly terminates downward motion of link 144 after a short travel, whereupon the pivot connection 143' of operating arm 143 to the lower end of link 144 becomes a fulcrum about which the last named arm swings, drawing the cage 149 downwardly and compressing spring 153 under force transmitted to operating arm 143 from crank arm 135 at their pin and slot connection 146, 147.

As best illustrated in FIGS. 14, 15 and 16, the spring cage 149 has pivotally mounted thereon, at a pin 155, a trip member 156 provided with a rearwardly facing camming formation 157 which, as the cage 149 descends with the arm 143 fulcrumming as described, is engaged with a part of the basic mounting bracket 14. It will be noted by reference to FIGS. 5 and 14 that the trip member 156 is provided with a transversely widened, forwardly facing lip formation 158 receivable in transversely aligned notches 159 formed at the rear of the nested end portions 131 at the ends of the tumblers 127–130 which lie adjacent the "no coin" linkage 136, in which notches 159 the trip's lip formation is adapted to engage the rear of the tumbler ends. Thus, as the trip member 156 swings counterclockwise in the manner described about its pivot at 155, as viewed in FIGS. 5 and 14, the result is that the forward lip formation 158 tilts all of the tumbler members 127–130 forwardly. The further result is that all four lifters 120 are swung clockwise (FIG. 1) forwardly thus engaging the offset lugs 118 of all the thrust links 115 to cause the latter to miss engagement with the short actuated arm 111 of ratchet dogs 110. The latter thus stay in the position shown in FIG. 1, blocking opening movement of all doors 18 at the respective upright boss extensions 93 thereof. Only when appropriate coinage is deposited may a single door be opened.

The machine also incorporates provisions for indicating to the potential purchaser the fact that one or more of the can storage columns or chutes has been emptied of its content. To this end, for each column 15 a "Select-Empty" indicator device 161 of the sort illustrated in FIGS. 12 and 13 is provided, reference being also had to FIGS. 1, 3 and 5. This device comprises a molded plastic housing 162 which is appropriately secured on the rear of the basic mounting bracket 14, with a bell crank-like operator 163 pivotally mounted at 164 within the housing. The bell crank 163 includes a longer arm member 165 extending forwardly through an opening in housing 162 and an opening 166 (FIG. 4) in the basic mounting bracket 14. Bell crank 163 has a shorter arm 168 within housing 162.

At its outer end, exposed forwardly of each selector device 10, the bell crank arm 165 is provided with a lip structure 169 adapted to receive a card 170 (FIGS. 1 and 12) which, as indicated in FIG. 4 bears, in vertically spaced relation to one another appropriate captions or indicia as to whether the can column in question is empty of cans to be vended ("Empty") or contains a supply thereof ("Select"). These captions are, depending respectively upon whether the lever arm 165 is elevated or depressed, adapted to be displayed behind windows W in the forward outer wall of the machine's cabinet. (See FIG. 4.)

The shorter arm 168 of bell crank 163 is biased by a coil spring 172 in a direction to urge the bell crank counterclockwise, as viewed in FIGS. 5 and 12 (clockwise in FIG. 1); and crank arm 168 is provided with a button 174 which is adapted to be engaged from the rear (see FIG. 1) by a pivoted operator lever or arm 176.

Thus, when a column 15 has a complement of cans the weight thereof causes the actuator 176 to be swung counterclockwise against button 174, in turn (see FIG. 1) swinging bell crank 163 counterclockwise about its pivot at 164, against the force of spring 172. This keeps a lower caption "Select" on the card 170 raised before the window W, signifying that the column in question is ready to vend. However, when the column becomes depleted the actuator 176 no longer sustains the bell crank, whereupon the bell crank arm 165 swings downward under gravitation and the force of spring 172. This brings the upper caption "Empty" before the window W.

The operation of the indicator device 161 is attended by another action in that the bell crank arm 165, in descending to show "Empty," simultaneously operates the lifter 120 of the associated selector assembly 10. To this end the arm 165 is provided with a laterally projecting pin 178 which engages the forward offset lug or flange 123 of lifter 120; with the result that as the bell crank arm 165 descends upon depletion of the supply of cans in the column the pin 178 thereon cams the lifter 120 forwardly, or clockwise about its pivot 99 as viewed in FIG. 1. Thus the lifter, in swinging from solid to dotted line position, disables the thrust link 115 from operating the bell crank type ratchet dog 110, and the shoulder 109 of the latter remains in position to block the door boss extension 93 when an attempt is made to raise the door 18 of the empty column 15.

The indicator device 161 has still another function, reference being had to FIGS. 1B and 1C in conjunction with FIGS. 1, 5, 18 and 19, namely that of disabling the coin control mechanism (not shown) from accepting further coinage when the vending apparatus is totally depleted of cans.

Thus, a normally open switch 179 is positioned just above and forwardly of the housing 162 of indicator device 161, said switch being provided with the usual operating leaf or arm 180. Such leaves are adapted to be sustained in an elevated position when at least one can to be vended is in the column by means of an elongated wire bail 181 suitably pivoted at 182 adjacent its opposite ends (FIG. 1C) to fixed mounting structure. This bail is normally maintained in the elevated "can-present" position shown in the dotted line position of FIG. 1B by all or any one of the bell crank arms 165 of the signalling device 161 in the elevated "can-present" position of the latter, assuming respectively that at least one can is present in any column 15 or a can is present in less than all of the columns.

Switch 179 is electrically connected through a conductor 183 with the coin control mechanism (not shown) in such manner that when the switch is closed, an electrical circuit will be completed through its conductor 183 which will disable the coin control from accepting further coinage. The longer bell crank arm 165 of the "empty" signalling device 161 is, as previously described, maintained in its elevated "cans-present" position by the can-responsive lever or arm 176 (FIGS. 1, 5 and 12), causing the lever arm 165 to drop to the lowered solid line position of FIG. 1B when cans are absent from the column 15 in question, and thus removing the support of that particular lever arm for the bail 181. As is evident, all such support will be taken away when the last can has been vended from the machine; whereupon switch 179 closes to signal the coin control mechanism as indicated above. The latter responds to the signal in a manner known to the art of coin control mechanisms, with which the present invention is not concerned.

*Operation*

In view of the fact that the operation of the selector sub-assembly 10, with its door-controlled and operated components and its control-device responsive components, has been described above in some detail, this being likewise true of the operation of the escapement and discharge sub-assembly 12, such details will not be repeated at length, a considerably briefer exposition of the manner of operation of the apparatus sufficing.

Assuming that proper coinage has been deposited in the coin control mechanism, its rod or link 144 follows the motion of the operator arm 143 (FIGS. 4, 5, 14, 15 and 16), as the arm 143 is driven by the crank arm 135 on shaft 89. The shoulder 134' on door boss 134 drives the selected actuator lever 95 counterclockwise, as viewed in FIG. 5; and this results in the selected one of the tumblers 127, 128, 129, 130 to straddle at its respective recess 132 the associated lifter arm 120 (FIG. 1) leaving the latter in the solid line position of FIG. 1. Thus, upon ensuing swinging motion of door 18 about its pivot arm sleeve 88, the thrust link 115 engages the arm 111 of bell crank dog 110, raising the same to permit the continued swinging motion of the upward extension 93 of the door boss 47. The result is that a can is positively discharged by the door-carried scoop 37 to the purchaser. The swing of the selected tumber 127–130 causes its unnotched remaining forward edge to shift all three remaining lifters 120 to the dotted line position of FIG. 1, with the result that the corresponding thrust links 115 are disabled from displacing the corresponding blocking dogs 110 upwardly; and the remaining three doors 18 remain blocked in column-closing position.

In a "no-coin" situation, the abrupt halting of downward movement of the coin control link 144 (FIGS. 3, 4 and 14) has the effect of depressing the spring cage 149, whereupon the cam formation 157 of the trip element 156 pivoted on cage 149 causes the trip to swing counterclockwise about its pivot, as viewed in FIGS. 5 and 14. This causes the lip member 158 on element 156 to engage all of the tumblers 127 through 130, in turn actuating all of the lifter arms 120 from the solid line position of FIG. 1 to the dotted line position; and as a result disabling all of the thrust links 115. All doors 18 remain blocked against other than a few degrees of initial opening movement.

When a column 15 becomes empty of cans, this results in the display of the appropriate caption on indicia card 170 at a window W; and, furthermore, the motion for this purpose is accompanied by a camming of the associated lifter arm 120 to a position in which the corresponding thrust link 115 is again disabled to operate blocking dog 110. As indicated above, in this situation the purchaser has the option of selecting at another door 18. In the event all columns are empty, it is the function of the coin return device (not shown) to return the coinage to the purchaser, this being an operational function with which the present invention is not concerned, except to signal the empty condition.

As for the can displacement and discharge sub-assembly 12, reference should be had to FIGS. 1 and 2 of the drawings. If no coinage has been deposited in the coin control device, nothing happens after a few degrees of swinging motion of the column door 18, and the parts remain in the position illustrated in solid line in FIG. 1, with the foremost or leading can C resting upon the lip 16 of chute 15, immediately beneath the elevated scoop 37, which acts as a stop preventing further forward and outward movement of the can past lip 16. When the door opens counterclockwise about its pivot arm sleeve 88, the scoop 37 and actuator arm 51 travel therewith, the latter reaching the position illustrated in dotted line in FIG. 1, to shift the actuator plate 32 clockwise about its pivot at 33. This causes the actuator lever 26 to swing counterclockwise about its pivot 30, bringing the roller 64 thereof into the root of the notch 61 on can stop member 21. But until this instant, the bail 25 of member 21 remains in obstructing relation to the second-most can C in the column, while the can stop lip 28 of lever 26 moves to and through the dotted line position of FIG. 1. Further discharge motion of scoop 37 causes the can to be positively displaced over the column lip 16 to the purchaser; and as this happens the curved guard 45 on the chute device 35 is being swung downwardly toward the position of FIG. 2; thus upon the parts moving to this position, the can stop escapement bail 25 of member 21 is fully elevated, so that a succeeding can C can roll forwardly against the stop lip 28 of member 26, the mildly curved surface 72 on the diamond-shaped actuator plate 32 holding the members 21 and 26 against a retrograde movement as this takes place. As the scoop 37 is returned to its initial position, the shoulder 53 on actuator arm 51 takes engagement with the pin or roller 73 of actuator plate 32, causing the latter and the associated escapement members 21, 26 to return to the initial position illustrated in FIG. 1 of the drawings.

The escapement parts are simple and economical in character, and exert a positive control action on cans descending the column 15, in each cycle discharging the foremost can and bringing the second-most can C to an intermediate position rearwardly of the scoop device 35. There is no possibility for a user to secure the delivery of more than a single can for a single deposition of coinage; and manipulation of the door 18 in an effort to do so is completely ineffective. The free-wheeling type of selector sub-assembly 10, with provisions to positively block non-selected doors against opening, is equally simple and effective in its operation.

FIGS. 17 through 25 illustrate a further modification and improvement, in particular reference to the coin-responsive control of the selector mechanism 10 of the apparatus. As has been indicated above, the selector unit, per se, is identical in its parts to what is shown in FIG. 1 of the drawings. The sole distinction arises in the manner in which they are positioned relative to one another in the absence of the deposit of proper coinage in the coin control mechanism (not shown). That is, FIG. 18 represents such a condition; and in this condition all of the tumblers 127-130 are locked in a clockwise position (FIG. 18) in which the several lifters 120 raise the lugs 124 on the thrust links 115 to the disabled position thereof. Thus, as previously explained, none of these lugs is capable of engaging and operating the short arm 111 of the blocking bell crank 110, so as to raise the latter out of position for blocking the extension 93 on door 18. This action is performed by locking lever means and actuating and release provisions therefor to be described. On the other hand, when such locking lever is released prior to manipulation of any door 18, the lifters 120 and thrust links 115 are permitted temporarily to resume the operative position illustrated in FIG. 19 of the drawings, proper coinage having been deposited in the coin mechanism as the only way of effecting the release of the locking lever. It then remains only for the purchaser to lift the selected door in order to obtain access to the merchandise, in the manner previously described in connection with FIGS. 1-16.

This scheme of operation is to be distinguished from that involved in the embodiment of the last named figures, in which the selector parts are normally in the position illustrated in FIG. 19 of the drawings initially after a coin has been deposited by the purchaser, but before he has made the initial manipulation of the door 18.

As indicated above, the invention contemplates, in lieu of the floating cage and linkage provisions of FIGS. 14, 15 and 16 for the purpose of preventing the dispensing of a can in the absence of appropriate coinage in the coin control mechanism, the use of the simplified solenoid-controlled latch lever, rod and abutment lock lever provisions which are best illustrated in FIGS. 17 and 20 through 25. Thus, a bell crank-shaped locking lever 184 is pivotally mounted upon the tumbler pivoting pin 99 at one end of the apparatus (the right-hand end as viewed in FIGS. 20 and 22), this lever 184 being provided with a horizontal offset lug 185. Lug 185 is, as shown in FIG. 25, disposed to extend behind the corresponding short radial end arms 131 of at least two of the tumblers 127, 128, 129, 130, three actually being shown as thus spanned. Lock lever 184 has another arm 186 projecting forwardly of the apparatus, which arm is equipped with a clip 187 similar to the clips 97 applied to the several actuator arms 95.

The locking lever arm 186 is adapted to be engaged at its clip 187 by a cam formation 189 integral with a hub 190 which is fixedly secured by a pin 191 on the shaft 89, adjacent the right-hand end of the latter as viewed in FIGS. 20 and 22, i.e., just axially outwardly of the endmost shaft pin 105 which is engageable by the actuator abutment 106 of the end-most door 18. An operating arm 193 is integrally formed on the cam hub 190, this arm extending rearwardly toward the set of tumblers 127-130 and being pivotally connected at its end to the upper end of a depending rod 194. A further depending rod 195 is pivotally mounted on locking lever 184 at 196, in offset relation to the pivotal axis of that lever on pin 99.

Refering to FIGS. 17 and 23, the rods 194, 195 extend downwardly toward the sheet metal mounting bracket 197 appropriately mounted fixedly on the apparatus. Rod 194 is a biasing rod tending to resist clockwise movement of the operating arm 193 and cam 189, as viewed in FIG. 17. To this end, the housing 197 is provided with an offset top flange 198 which is apertured to receive the lower end of rod 194, and a coil compression spring 199 surrounding rod 194 acts between the flange 198 and a fixed abutment 200 on rod 194 to resist downward movement of the latter.

The second rod 195 is a two-part one and its lower end also extends downwardly through an aperture in the flange 198. The upper half of rod 195 fixedly carries a hex-shaped turnbuckle 201, into which the lower part of the rod is threadedly engaged to adjust the overall length of rod 195. The lower end of the latter threadedly carries a stop nut 202 which is taken up into engagement with the turnbuckle 201 when the proper length adjustment is had.

Normally, and prior to insertion of coinage in the coin control mechanism (not shown), the rod 195 is maintained in a relatively elevated position, resting upon the top of an upright arm 203 of a three-armed latch abutment lever 204 which is pivotally mounted within the bracket 197 at 205, the arm 203 then being in the position shown in dotted line in FIG. 17. Latch abutment lever 204 is urged to this position by means of a coil tension spring 207 anchored to the bracket 197.

The reference numeral 208 designates a normally closed switch which is adapted to be placed in open condition by a second arm 209 of the latch abutment lever 204; and a third arm 210 of this lever is pivotally connected at 211 to the armature of a solenoid 212 fixedly mounted by bracket 197. A fixed bracket extension 214 fixedly mounts a second normally closed switch 215.

It is seen from the above that, in the "no-coin" condition of the apparatus the offset lug 206 on latch abutment lever 204 will sustain the upwardly extending rod 195, and in turn the locking lever 184, in a counterclockwise-urged position of the latter. In engaging the rear of two or more of the tumblers 127-130, the offset lug 185 of lock lever 184 will cause all four of those tumblers to be swung from the solid line position of FIG. 24 to the dotted line position thereof. As a result, through the connections previously described, the lifters 120 will be swung clockwise, as viewed in FIG. 18, elevating all four thrust links 115 to the disabled condition of the latter. The blocking levers 110 remain in position to prevent full opening movement of the doors 18. As thus urged by locking lever 184, the tumblers 127-130 are positioned substantially forwardly of the normal position of the actuator levers 95. The switch 208 is in its normal closed condition, and the same is true of the further switch 215. The control button 217 of the former is released by the arm 209 of latch abutment lever 204 and the control button 218 of the latter being released by the operating leaf or arm 219 of switch 215.

However, upon deposit of proper coinage in the coin control mechanism the solenoid 212 is, through the agency of conventional coin tripped contact means built into the latter, electrically energized momentarily, swinging latch abutment lever 204 clockwise, as viewed in FIG. 17. Resultant withdrawal of the lever lug 206 from beneath the lower end of rod 195 causes the latter to drop and, accordingly, allow the locking lever 184 to swing to the rear (clockwise about pin 99 in FIGS. 17 and 24) from its locking position, with the result that the tumblers also return to their clockwise unlocked, solid line position of FIG. 24. The lifters 120 and thrust links 115 return to the non-disabled position of the latter shown in FIG. 19, with the thrust link of the selected door ready to lift the blocking member from door blocking position just as soon as the door 18 is initially raised.

As the purchaser now lifts the selected door 18 to obtain access to a can, and as the door approaches its final position to release such can through the agency of the can escapement and discharge mechanism 12, the cam 189 in rotating with the shaft 89 will engage the clip 187 on lock lever arm 186, causing a swing of lever 184 in a counterclockwise direction, as viewed in FIGS. 17 and 24. This has the effect, through the engagement of lever lug 185 with the rear of certain of the tumblers 127–130, of returning all four of the latter to the locked position shown in dotted line in FIG. 24. The action is opposed by the spring 199 on rod 194, and as the lower end of rod 195 clears the top of the lug 206 on latch abutment lever 204, the latter is swung counterclockwise (FIG. 17) by the tension spring 207, resuming its posititon in sustaining engagement beneath the rod 195. Until this time the lower end of rod 195 holds lever 204 in its solid line position.

Thus switch 208 returns to its normal closed condition. Switch 215, having also been opened due to actuation of its operating arm 219 by the lower end of rod 194 in moving downwardly to the dotted line position, also returns to normal closed condition as rod 194 elevates. This is under actuation by the cam arm 193 as the shaft 89 returns counterclockwise to its original position in the closing of door 18. All parts are thus returned to locked condition; and the opening of the switches 208 and 215 during the vending operation has the effect of preventing the coin control mechanism from accepting coinage in this interval by interrupting conventional circuitry built into the coin control mechanism.

Acceptance of the coinage by the latter has previously caused de-energization of solenoid 212, permitting the parts to restore to locking condition in the described manner.

Thus it is seen that in both embodiments the invention affords improvements in a coin controlled article vending mechanism, including means by which articles are stacked in a series of side-by-side storage columns, each column normally closed by a manually movable door; and in which a purchaser, having deposited proper coinage in the coin control, makes his selection by the simple manipulation of raising one of the doors, thus automatically blocking opening movement of all the other doors, and at the same instant receives the selected article. This simplified scheme is believed to be novel and important in the vending machine art.

Provisions are incorporated in the apparatus or system for not only preventing the opening of the door of any column of the apparatus when that column is depleted of articles, but also for the control of the coin mechanism to prevent its receiving and retaining coinage in the event the apparatus is empty of articles. These effects both take place on a response of the empty signalling device 161 reflecting the empty condition, whether of a single column or of all of the columns.

Thus, should any given column be depleted, this fact is made mechanically effective through the device or signalling mechanism 161 to block and prevent the opening of the door of the column in question. Hence the purchaser, though he will not receive an article from that column, may still obtain an article from another, undepleted column. However, this should not be necessary since the device or mechanism 161 also visually signals the purchaser the fact of the empty condition.

Furthermore, the arrangement discussed in connection with FIGS. 1B and 1C is effective, upon issuance of the last vended article from the apparatus to electrically disable the coin control mechanism from receiving and retaining any further coinage until the supply of articles has been replenished.

The switches 208, 215 insure that coinage will not be accepted and retained by the coin control mechanism during an actual vending operation which has been made possible by a prior deposition of coinage. Likewise, different types of provisions, discussed in detail in connection with the two different embodiments of the apparatus, effectively prevent opening of any door in the absence of proper coinage in the coin control.

The drawings and the foregoing specification constitute a description of the improved mechanical can vending system in such full, clear, concise and exact terms as to enable any person skilled in the art to practice the invention, the scope of which is indicated by the appended claims.

What we claim as our invention is:

1. Dispensing apparatus of the type described for operation in conjunction with coin controlled means, comprising a can storage column having a closure door pivotally mounted adjacent a discharge end of the column, and a selector mechanism for said column operable by said door to optionally enable opening of the door depending upon the control of the apparatus by said first named means, said mechanism comprising a movable dog engageable by the door to block substantial opening of the latter, a member movably carried by the door to engage and move said dog to non-blocking position, and means optionally engageable with said member, under control of said first named means, to move said member relative to the door and thus disable said member from so moving said dog.

2. Dispensing apparatus of the type described for operation in conjunction with coin controlled means, comprising a plurality of can storage columns each having a closure door pivotally mounted adjacent a discharge end of the column, and a selector mechanism for each column operable by said door to optionally enable opening of the door depending upon the control of the apparatus by said first named means, said mechanism comprising a movable dog engageable by the door to block substantial opening of the latter, a first member movably carried by the door to engage and move said dog to non-blocking position, and means optionally engageable with said member, under control of said first named means, to move said member relative to the door and thus disable said member from so moving said dog, said last named means comprising, for each selector mechanism, a second member movable to engage and so disable said first member.

3. Dispensing apparatus of the type described for operation in conjunction with coin controlled means, comprising a plurality of can storage columns each having a closure door pivotally mounted adjacent a discharge end of the column, and a selector mechanism for each column operable by said door to optionally enable opening of the door depending upon the control of the apparatus by said first named means, said mechanism comprising a movable dog engageable by the door to block substantial opening of the latter, a first member movably carried by the door to engage and move said dog to non-blocking position, and means optionally engageable with said member, under control of said first named means, to disable said member from so moving said dog, said last named means comprising, for each selector mechanism, a second member movable to engage and so disable said first member, and a movable tumbler slotted to straddle said second member of its associated selector mechanism upon movement of the tumbler, and thereby cause said first member to remain non-disabled, said tumbler in so moving being engageable with the second members of other selector mechanisms to cause the same to disable the first members of such mechanisms.

4. Dispensing apparatus of the type described for operation in conjunction with coin controlled means, comprising a plurality of can storage columns each having a closure door pivotally mounted adjacent a discharge end of the column, and a selector mechanism for each column operable by said door to optionally enable opening of the door depending upon the control of the apparatus by said first named means, said mechanism comprising a movable dog engageable by the door to block substantial opening of the latter, a first member movably carried by the door to engage and move said dog to non-blocking position, and means optionally engageable with said member, under control of said first named means, to disable said member from so moving said dog, said last named means comprising, for each selector mechanism, a second member movable to engage and so disable said first member, a movable tumbler slotted to straddle said second member of its associated selector mechanism upon movement of the tumbler, and thereby cause said first member to remain non-disabled, said tumbler in so moving being engageable with the second members of other selector mechanisms to cause the same to disable the first members of such mechanisms, and means operated by each door, under control of said coin controlled means, to move a tumbler for the described non-disabling and disabling of the respective first members.

5. An article dispensing system comprising means providing a discharge opening for articles arranged in each of a plurality of adjacent article storing columns, a door for each column mounted for movement to a position to expose said opening and discharge an article from its column, an element responsive in movement to the presence or absence of coinage in a coin control mechanism, and means controlled by movement of said responsive element and operatively connected to all of said doors to permit an opening of only one thereof to discharge an article in the presence of coinage in said mechanism, including a movable member for each door operable into and out of position to prevent opening of that door, a further member shiftable on each door and operatively connected to said first named member to move the same out of said preventing position upon shift of said further member on and relative to the door, and means responsive to said element and operatively connected to said further member to so shift the latter.

6. An article dispensing system comprising means providing a discharge opening for articles arranged in each of a plurality of adjacent article storing columns, a door for each column mounted for movement to a position to expose said opening and discharge an article from its column, an element responsive in movement to the presence or absence of coinage in a coin control mechanism, and means controlled by movement of said responsive element and operatively connected to all of said doors to permit an opening of only one thereof to discharge an article in the presence of coinage in said mechanism, including a movable member for each door operable into and out of position to prevent opening of that door, a further member shiftable on each door and operatively connected to said first named member to move the same out of said preventing position upon shift of said further member on and relative to the door, and means responsive to said element and operatively connected to said further member to so shift the latter, said first named members blocking the opening of all remaining doors than said one door upon predetermined opening of the latter.

7. An article dispensing system comprising means providing a series of article storage and dispensing columns each having a discharge normally closed by a movable door, each door having first means effective to prevent an opening movement thereof, including a first member moving with said door and a second member to engage said first member to block movement of the latter and the door, and second means carried by and operable upon movement of that door to move said second member from position to blockingly engage said first member, thus to disable said first means from preventing said opening movement, and further means operable in response to an opening movement of any door of said series to prevent an opening movement of all other doors of the series.

8. An article dispensing system in accordance with claim 7, and further comprising an escapement mechanism for each column operative to control the successive discharge of articles therefrom, and means carried on each door and operatively connected to its escapement mechanism, said last named means being actuated in response to said opening movement of the respective doors to operate said respective escapement mechanisms.

9. A dispenser comprising a cabinet having a plurality of compartments, each compartment having an access opening and an independently operated door therefor, means providing a single article in each compartment for manual removal only when the door associated with its access opening is moved to open position, means controlling opening movement of said doors and constructed and arranged to provide for unrestricted opening movement of any single selected door upon initial opening movement thereof, and means responsive to initial opening movement of said single selected door to prevent said unrestricted opening of any doors other than the single selected door, said last named means including individual members for each door adapted to coact with the latter to block it and prevent said unrestricted opening thereof, and individual members movable with the respective doors and acting to disable only the first named member of the selected door from preventing its unrestricted opening, each of said last named individual members being engageable wtih the respective first named individual members to move the latter out of position to so block and prevent the unrestricted opening of the selected door.

10. Article dispensing apparatus comprising means providing a plurality of article storage columns each having a discharge opening normally closed by a manually movable, selected door, and means permitting opening movement of one and only one of said doors, comprising a blocking member for each door movable into and out of position to block opening movement of that door, an actuating element operatively connected to each door and engageable upon movement of the latter to move its blocking member out of said blocking position, said element being movable into and out of position for said engagement with the blocking member, and a series of tumblers each having an operating connection to one of said actuating elements to so move the latter into and out of blocking member engaging position, each tumbler being movable to a position in which it occasions movement of at least one of said actuating elements, through the operating connection of the latter, out of position to engage and move the blocking member of that element out of its blocking position, said tumbler failing in said tumbler movement to move another actuating element, through its operating connection, out of the position of that element to engage and move its blocking member out of blocking position.

11. Article dispensing apparatus adapted to dispense an article upon deposit of appropriate coinage in a coin control mechanism operatively connected to said apparatus, comprising means providing a plurality of article storage columns each having a discharge opening normally closed by a manually movable, selected door, and means permitting opening movement of one and only one of said doors only upon said deposit of appropriate coinage, comprising a blocking member for each door movable into and out of position to block opening movement of that door, an actuating element operatively connected to each door and engageable upon movement of the latter to move its blocking member out of said blocking position, said element being movable into and out of position for said engagement with the blocking member, a series of tumblers each having an operating connection to one of said actuating elements to so move the latter into and out of blocking member engaging position, each tumbler being movable to a position in which it occasions movement of at least one of said actuating elements, through the operating connection of the latter, out of position to engage and move the blocking member of that element out of its blocking position, said tumbler failing in said tumbler movement to move another actuating element, through its operating connection, out of the position of that element to engage and move its blocking member out of blocking position, and means controlled in response to said coin control mechanism and acting prior to the movement of a selected door and until the deposit of appropriate coinage in the mechanism to maintain all of said tumblers in a position, acting through said operating connections, to hold all of said actuating elements out of position to engage and move the respective blocking members out of blocking position.

12. Article dispensing apparatus adapted to dispense an article upon deposit of appropriate coinage in a coin control mechanism operatively connected to said apparatus, comprising means providing a plurality of article storage columns each having a discharge opening normally closed by a manually movable, selected door, and means permitting opening movement of one and only one of said doors only upon said deposit of appropriate coinage, comprising a blocking member for each door movable into and out of position to block opening movement of that door, an actuating element operatively connected to each door and engageable upon movement of the latter to move its blocking member out of said blocking position, said element being movable into and out of position for said engagement with the blocking member, a series of tumblers each having an operating connection to one of said actuating elements to so move the latter into and out of blocking member engaging position, each tumbler being movable to a position in which it occasions movement of at least one of said actuating elements, through the operating connection of the latter, out of position to engage and move the blocking member of that element out of its blocking position, said tumbler failing in said tumbler movement to move another actuating element, through its operating connection, out of the position of that element to engage and move its blocking member out of blocking position, and means controlled in response to said coin control mechanism and acting upon the deposit of appropriate coinage in the latter and movement of a selected door to move all of said tumblers to a position, acting through said operating connections, to hold all of said actuating elements out of position to engage and move the respective blocking members out of blocking position.

13. Article dispensing apparatus adapted to dispense an article upon deposit of appropriate coinage in a coin control mechanism operatively connected to said apparatus, comprising means providing a plurality of article storage columns each having a discharge opening normally closed by a manually movable, selected door, and means permitting opening movement of one and only one of said doors only upon said deposit of appropriate coinage, comprising a blocking member for each door movable into and out of position to block opening movement of that door, an actuating element operatively connected to each door and engageable upon movement of the latter to move its blocking member out of said blocking position, said element being movable into and out of position for said engagement with the blocking member, a series of tumblers each having an operating connection to one of said actuating elements to so move the latter into and out of blocking member engaging position, each tumbler being movable to a position in which it occasions movement of at least one of said actuating elements, through the operating connection of the latter, out of position to engage and move the blocking member of that element out of its blocking position, said tumbler failing in said tumbler movement to move another actuating element, through its operating connection, out of the position of that element to engage and move its blocking member out of blocking position, and means controlled in response to said coin control mechanism and acting prior to the movement of a selected door and until the deposit of appropriate coinage in the mechanism to maintain all of said tumblers in a position, acting through said operating connections, to hold all of said actuating elements out of position to engage and move the respective blocking members out of blocking position, said last named means comprising an electrical device energized only in the presence of coinage in said coin control mechanism, and means operatively connected to said device and responsive to energization thereof to cause movement of said tumblers out of the last named position of the latter.

14. An article dispensing system comprising means providing a discharge opening for articles arranged in each of a plurality of adjacent article storing columns, a door for each column mounted for movement to a position to expose said opening and discharge an article from its column, electrical means energized only in response to the presence of coinage in a coin control mechanism, and means controlled by said mechanism upon energization thereof and operatively connected to all of said doors to permit an opening of only one thereof to discharge an article in the presence of coinage in said mechanism, said controlled means comprising a blocking member for each door engageable by a part on the latter to block opening thereof, an operating member for each door engageable with one of said blocking members to shift the same out of blocking position, and means operative when said electrical means is de-energized to prevent all of said operating members from so shifting all of the respective blocking members.

15. An article dispensing system operable under the control of a coin receiving device, comprising means providing a series of article storage and dispensing columns each having a discharge opening which is normally closed by a movable door and through which an article is dispensed upon an opening movement of the door, means operable in response to such opening movement of any given one door of said series to prevent an opening movement of all other doors of the series, means adapted to be operatively connected to said coin receiving device for the mutual control of the latter and said system, including means responsive to signal from said device to prevent the opening movement of any door of the series in the absence of coinage deposited in said device, means adapted to be connected to said device and responsive to the absence of articles in all of said columns to disable said device from receiving coinage, and means responsive to the absence of cans in any of said columns to prevent the opening movement of the door of that column.

16. An article dispensing system operable under the control of a coin receiving device, comprising means providing a series of article storage and dispensing columns each having a discharge opening which is normally closed by a movable door and through which an article is dispensed upon an opening movement of the door, each door having first means effective to prevent an opening movement thereof, including a first member moving with said door and a second member to engage said first member to block movement of the latter and the door, and second means carried by and operable upon movement of that door to move said second member from position to blockingly engage said first member, thus to disable said first means from preventing such opening movement, means operable in response to such opening movement of any door of said series to prevent an opening movement of all other doors of the series, and means operatively connected to said last named means and responsive to the absence of cans in any given one of said columns to prevent the opening movement of the door of that column.

control of a coin receiving device, comprising means providing a series of article storage and dispensing columns each having a discharge opening which is normally closed by a movable door and through which an article is dispensed upon an opening movement of the door, each door having first means effective to prevent an opening movement thereof and second means operable upon movement of that door to disable said first means from preventing said opening movement, means operable in response to such opening movement of any door of said series to prevent an opening movement of all other doors of the series, and means adapted to be operatively connected to said coin receiving device for the mutual control of the latter and said system, including means responsive to signal from said device to prevent the opening movement of any door of the series in the absence of coinage deposited in said device, and means adapted to be connected to said device and responsive to the absence of articles in all of said columns to disable said device from receiving coinage.

17. An article dispensing system operable under the control of a coin receiving device, comprising means providing a series of article storage and dispensing columns each having a discharge opening which is normally closed by a movable door and through which an article is dispensed upon an opening movement of the door, each door having first means effective to prevent an opening movement thereof and second means operable upon movement of that door to disable said first means from preventing said opening movement, means operable in response to such opening movement of any door of said series to prevent an opening movement of all other doors of the series, and means adapted to be operatively connected to said coin receiving device for the mutual control of the latter and said system, including means responsive to signal from said device to prevent the opening movement of any door of the series in the absence of coinage deposited in said device, and means adapted to be connected to said device and responsive to the absence of articles in all of said columns to disable said device from receiving coinage, and means responsive to the absence of cans in any of said columns to prevent the opening movement of the door of that column.

19. A dispensing system in accordance with claim 14, in which said controlled means includes means placing said operating member of all doors other than the opened one in a position not to engage and shift the respective blocking members out of the blocking position thereof.

20. A dispensing system in accordance with claim 14, in which said last named operative means acts when the electrical means is de-energized to place all of said operating members in a position not to engage and shift any of the respective blocking members.

References Cited by the Examiner

UNITED STATES PATENTS

| | | | |
|---|---|---|---|
| 2,215,024 | 9/40 | Van Tuyl | 221—125 |
| 2,272,683 | 2/42 | Srodulski. | |
| 2,513,595 | 7/50 | Stewart | 221—125 |
| 2,521,458 | 9/50 | Huheey et al. | 221—125 |
| 2,529,600 | 11/50 | Dixon | 221—152 X |
| 3,102,762 | 9/63 | Johnson et al. | 221—125 |

SAMUEL F. COLEMAN, *Primary Examiner.*

ERNEST A. FALLER, Jr., *Examiner.*